US012217060B1

(12) United States Patent
Spadini et al.

(10) Patent No.: US 12,217,060 B1
(45) Date of Patent: Feb. 4, 2025

(54) INSTRUCTION FUSION

(71) Applicant: Apple Inc., Cupertino, CA (US)

(72) Inventors: Francesco Spadini, Sunset Valley, TX (US); Skanda K. Srinivasa, Austin, TX (US); Reena Panda, Cedar Park, TX (US); Brian T. Mokrzycki, Portland, OR (US); Haoyan Jia, Ellicott City, MD (US); Zhaoxiang Jin, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/176,457

(22) Filed: Feb. 28, 2023

Related U.S. Application Data

(60) Provisional application No. 63/376,822, filed on Sep. 23, 2022.

(51) Int. Cl.
*G06F 9/30* (2018.01)

(52) U.S. Cl.
CPC ........ *G06F 9/30145* (2013.01); *G06F 9/3001* (2013.01); *G06F 9/30181* (2013.01)

(58) Field of Classification Search
CPC . G06F 9/30145; G06F 9/3001; G06F 9/30181
See application file for complete search history.

(56) References Cited

U.S. PATENT DOCUMENTS

| 5,303,356 | A | * | 4/1994 | Vassiliadis | ......... G06F 9/30152 712/E9.055 |
|---|---|---|---|---|---|
| 5,420,992 | A | | 5/1995 | Killian | |
| 5,689,695 | A | | 11/1997 | Read | |
| 5,774,737 | A | | 6/1998 | Nakano | |
| 5,794,063 | A | | 8/1998 | Favor | |

(Continued)

FOREIGN PATENT DOCUMENTS

WO 2019218896 A1 11/2019

OTHER PUBLICATIONS

Office Action in U.S. Appl. No. 17/652,501 mailed Nov. 1, 2023, 47 pages.

(Continued)

*Primary Examiner* — Corey S Faherty
(74) *Attorney, Agent, or Firm* — Kowert, Hood, Munyon, Rankin & Goetzel, P.C.; Gentry C. McLean; Dean M. Munyon

(57) ABSTRACT

Techniques are disclosed that relate to executing pairs of instructions. A processor may include fusion detector circuitry configured to detect a pair of fetched instructions and fuse the pair of fetched instructions into a fused instruction operation, and execution circuitry coupled to the fusion detector circuitry and configured to execute the fused instruction operation. In some embodiments the pair of instructions is executable to generate a remainder of a division operation. In some embodiments the pair of instructions is executable to compare two operands and perform a write operation based on the comparison. In some embodiments the pair of instructions is executable to perform an operation and apply a mask bit sequence to the result. The fusion detector circuitry may also be configured to obtain first and second portions of a constant value from first and second instructions and store the first and second portions in a destination register.

16 Claims, 13 Drawing Sheets

(56) References Cited

U.S. PATENT DOCUMENTS

| | | | |
|---|---|---|---|
| 5,805,486 A | 9/1998 | Sharangpani | |
| 5,889,984 A | 3/1999 | Mills | |
| 6,292,888 B1 | 9/2001 | Nemirovsky | |
| 6,295,599 B1 | 9/2001 | Hansen et al. | |
| 6,338,136 B1 | 1/2002 | Col | |
| 6,560,624 B1 | 5/2003 | Otani et al. | |
| 6,754,810 B2 | 6/2004 | Elliott et al. | |
| 7,055,022 B1 | 5/2006 | Col | |
| 7,818,550 B2 * | 10/2010 | Vaden | G06F 9/30065 712/226 |
| 8,078,845 B2 | 12/2011 | Sheffer et al. | |
| 8,713,084 B2 * | 4/2014 | Weinberg | G06F 7/4873 708/650 |
| 9,501,286 B2 | 11/2016 | Col | |
| 9,747,101 B2 | 8/2017 | Ould-Ahmed-Vall et al. | |
| 10,324,724 B2 | 6/2019 | Lai | |
| 10,579,389 B2 | 3/2020 | Caulfield | |
| 2003/0236966 A1 | 12/2003 | Samra | |
| 2004/0034757 A1 | 2/2004 | Gochman | |
| 2004/0128483 A1 | 7/2004 | Grochowski | |
| 2005/0084099 A1 | 4/2005 | Montgomery | |
| 2005/0289208 A1 * | 12/2005 | Harrison | G06F 7/4873 708/502 |
| 2007/0038844 A1 | 2/2007 | Valentine | |
| 2010/0115248 A1 | 5/2010 | Ouziel | |
| 2011/0035570 A1 | 2/2011 | Col | |
| 2011/0264896 A1 | 10/2011 | Parks | |
| 2011/0264897 A1 | 10/2011 | Henry | |
| 2012/0144174 A1 * | 6/2012 | Talpes | G06F 9/30145 712/246 |
| 2013/0024937 A1 | 1/2013 | Glew | |
| 2013/0125097 A1 | 5/2013 | Ebcioglu et al. | |
| 2013/0179664 A1 | 7/2013 | Olson et al. | |
| 2013/0262841 A1 | 10/2013 | Gschwind | |
| 2014/0047221 A1 | 2/2014 | Irwin | |
| 2014/0208073 A1 | 7/2014 | Blasco-Allue | |
| 2014/0281397 A1 | 9/2014 | Loktyukhin | |
| 2014/0351561 A1 | 11/2014 | Parks | |
| 2015/0039851 A1 | 2/2015 | Uliel | |
| 2015/0089145 A1 | 3/2015 | Steinmacher-Burow | |
| 2016/0004504 A1 | 1/2016 | Elmer | |
| 2016/0179542 A1 | 6/2016 | Lai | |
| 2016/0291974 A1 | 10/2016 | Lingam | |
| 2016/0378487 A1 * | 12/2016 | Ouziel | G06F 9/3017 712/208 |
| 2017/0102787 A1 | 4/2017 | Gu | |
| 2017/0123808 A1 * | 5/2017 | Caulfield | G06F 9/3836 |
| 2017/0177343 A1 | 6/2017 | Lai | |
| 2018/0129498 A1 | 5/2018 | Levison | |
| 2018/0129501 A1 | 5/2018 | Levison | |
| 2018/0267775 A1 | 9/2018 | Gopal | |
| 2018/0300131 A1 | 10/2018 | Tannenbaum | |
| 2019/0056943 A1 | 2/2019 | Gschwind | |
| 2019/0102197 A1 | 4/2019 | Kumar et al. | |
| 2019/0108023 A1 | 4/2019 | Lloyd | |
| 2020/0042322 A1 | 2/2020 | Wang | |
| 2020/0402287 A1 | 12/2020 | Shah | |
| 2021/0124582 A1 | 4/2021 | Kerr | |
| 2022/0019436 A1 | 1/2022 | Lloyd | |
| 2022/0035634 A1 | 2/2022 | Lloyd | |

OTHER PUBLICATIONS

J. E. Smith, "Future Superscalar Processors Based On Instruction Compounding," Published 2007, Computer Science, pp. 121-131.

Christopher Celio et al., "The Renewed Case for the Reduced Instruction Set Computer: Avoiding ISA Bloat with Macro-Op Fusion for RISC-V," arXiv:1607.02318v1 [cs.AR] Jul. 8, 2016; 16 pages.

Abhishek Deb et al., "SoftHV : A Hw/Sw Co-designed Processor with Horizontal and Vertical Fusion," CF 11, May 3-5, 2011, 10 pages.

Ian Lee, "Dynamic Instruction Fusion," UC Santa Cruz Electronic Theses and Dissertations, publication date Dec. 2012, 59 pages.

* cited by examiner

INSTRUCTION FUSION

CROSS-REFERENCE TO RELATED APPLICATIONS

The present application claims priority to U.S. Provisional App. No. 63/376,822 entitled "Instruction Fusion," filed Sep. 23, 2022, the disclosure of which is incorporated by reference herein in its entirety.

BACKGROUND

Technical Field

This disclosure relates generally to a computer processor and, more specifically, to the execution of certain pairs of instructions.

Description of the Related Art

Modern computer systems often include processors that are integrated onto a chip with other computer components, such as memories or communication interfaces. During operation, those processors execute instructions to implement various software routines, such as user software applications and an operating system. As part of implementing a software routine, a processor normally executes various different types of instructions, such as instructions to generate values needed by the software routine. For example, a processor may execute instructions that calculate an address within memory, that write a constant value needed by the program to a register, or that perform a division of two numbers and provide a remainder. The specific set of instructions executed by a given processor is defined by the processor's instruction set architecture (ISA).

DETAILED DESCRIPTION

Figure 1:
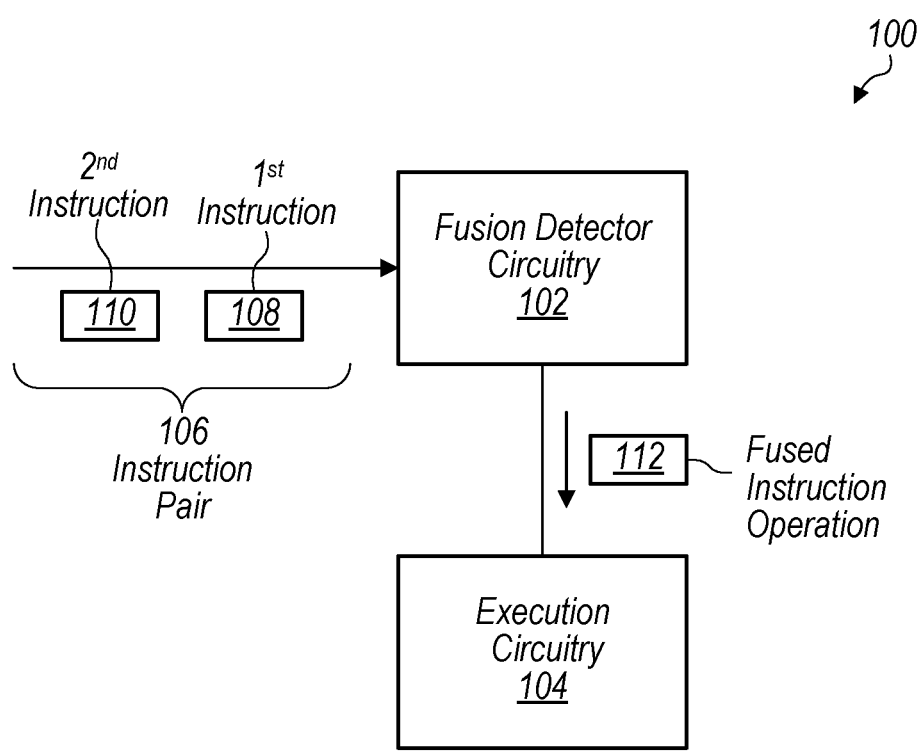
FIG. 1 is a block diagram illustrating example elements of a processor configured to fuse instructions, according to some embodiments.

As mentioned above, the set of instructions available to a programmer using a given processor is defined by the processor's instruction set architecture (ISA). There are a variety of instruction set architectures in existence (e.g., the x86 architecture originally developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. For a given ISA, there are often operations that programmers want to implement that do not correspond to a single instruction in the ISA. Such operations may therefore be implemented using two or more instructions.

Using a pair (or more) of instructions to implement an operation that could be done with one instruction can cause technical problems that reduce processor performance in multiple ways. As one example, execution of two instructions may increase the latency, or number of clock cycles used, to implement an operation. An increase in latency may particularly result if one or both of the two instructions implements a simple operation that can be done in a single cycle.

In addition to potentially increasing latency of a processor operation, using a pair of instructions rather than a single instruction can reduce performance by adding to traffic in the processor's instruction pipeline, potentially increasing power usage or congestion in elements such as the scheduler and reservation stations. Therefore, "fusing" a pair of instructions for execution as a single decoded instruction (or "instruction operation" as used herein) can reduce the number of resources that would otherwise be consumed by processing those instructions separately. For example, an entry of a re-order buffer may be saved by storing one instead of two decoded instructions and an additional physical register may not need to be allocated. More efficient and/or lower-power operation of the processor may therefore result from instruction fusion.

The present disclosure recognizes certain instruction pairs that can be fused for implementation as a single instruction operation using additional or modified execution logic and describes techniques for detecting, fusing, and executing such instruction pairs. Embodiments of the disclosed processors and methods implement fused execution of one or more of the types of instruction pairs described herein.

In one embodiment described herein, an instruction pair detected for fusing includes a first instruction that is executable to perform a divide operation and a second instruction that is executable to read the quotient, dividend and divisor from the divide operation, calculate a remainder of the divide operation, and overwrite the quotient with the remainder. In an embodiment, the second instruction is a multiply-subtract instruction.

In an embodiment, an instruction pair detected for fusing includes a first instruction that is executable to perform an operation to produce an operation result and a second instruction that is executable to perform a logical AND operation of the operation result with a specified mask bit sequence. In an embodiment, the first operation is an arithmetic logic unit (ALU) instruction.

In an embodiment, an instruction pair detected for fusing includes a first instruction that is executable to compare a first operand to a second operand and a second instruction that is executable to write a value to a destination register based on the first and second operands and a result of the comparison. Another instruction pair that may be detected for fusing is a pair of instructions executable to store into a destination register a constant value having a bit length larger than a width of an immediate value field of a first instruction or second instruction within the pair of instructions. In various embodiments, the instruction pairs fused herein include integer instructions operating on integer values.

Figure 3:
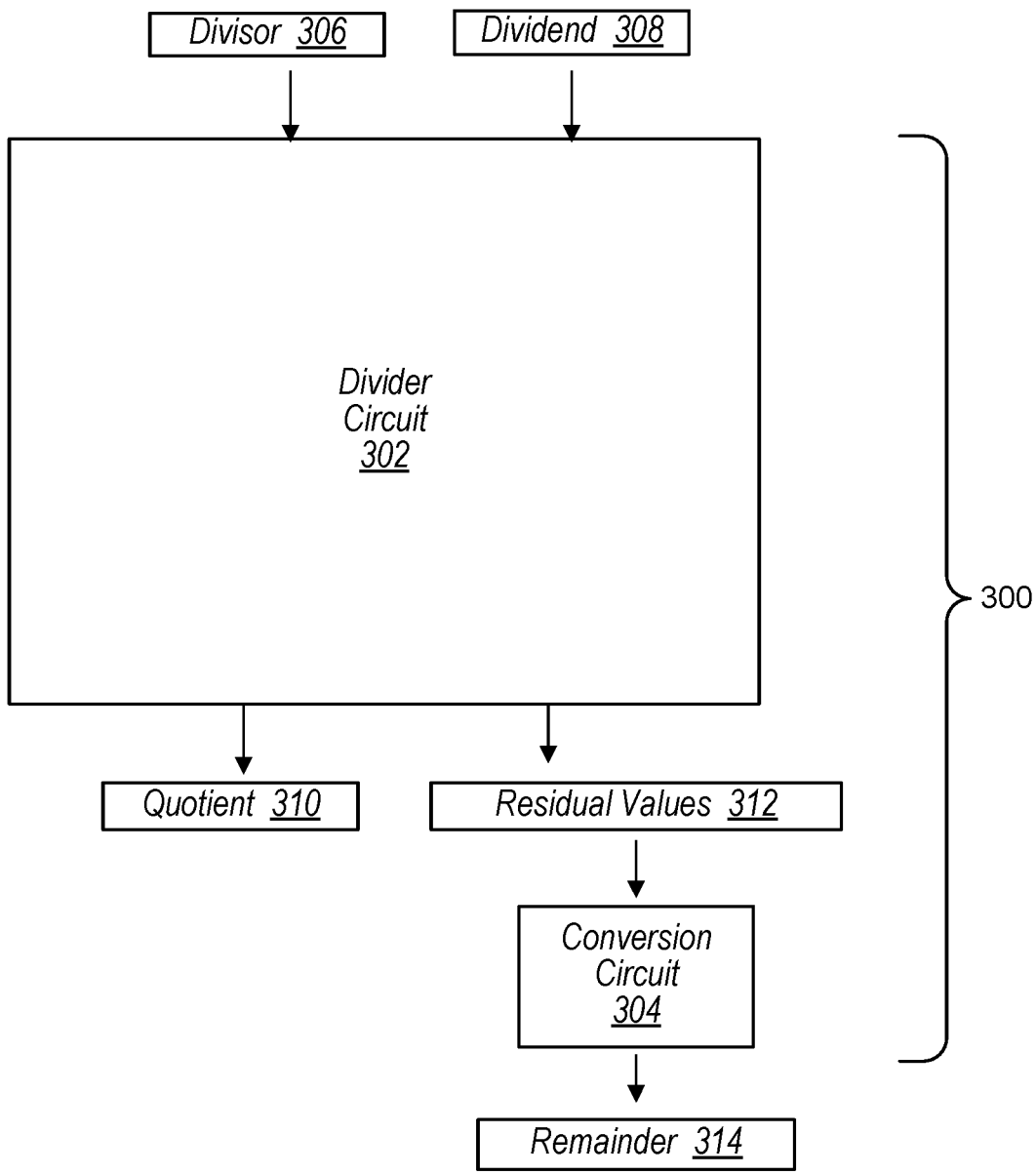
FIG. 3 is a block diagram illustrating an example of execution circuitry for executing a fused remainder instruction operation, according to some embodiments.

FIG. 1 illustrates certain elements of a processor 100 configured to fuse certain instruction pairs. As shown, processor 100 includes fusion detector circuitry 102 coupled to execution circuitry 104. In an example of a fusion process, an instruction pair 106 including a first instruction 108 and second instruction 110 are received by fusion detector circuitry 102. If eligible for fusion, the two instructions may be fused to form fused instruction operation 112, which is sent to execution circuitry 104 for execution. As discussed above, first instruction 108 of instruction pair 106 may in some embodiments be an instruction for performing a divide operation, and second instruction 110 may be an instruction to calculate a remainder of the divide operation and overwrite the quotient of the divide operation with the remainder. Such an embodiment is further illustrated in FIG. 3 and FIG. 7. In an embodiment, execution circuitry 104 for executing a fused instruction operation for using the dividend and divisor to calculate the remainder includes a divider circuit configured to generate a set of residual values related to the remainder and a conversion circuit configured to convert the set of residual values into the remainder. An example of such execution circuitry is illustrated in FIG. 3.

Figure 5:
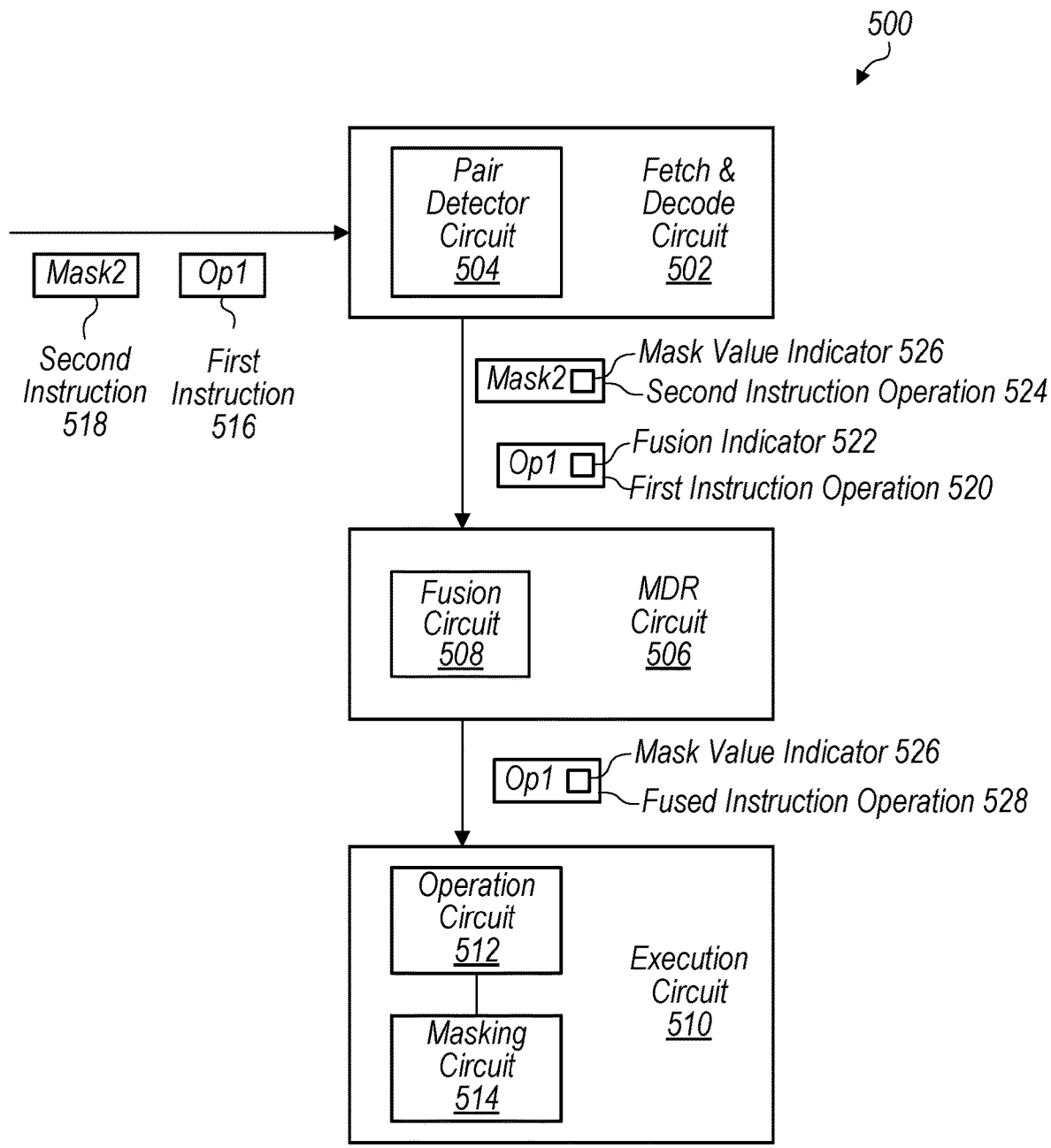
FIG. 5 is a block diagram illustrating example elements of a processor configured to fuse instructions for selecting a portion of an operation result, according to some embodiments.

In some embodiments first instruction 108 is an instruction for performing an operation to produce an operation result, and second instruction 110 is an instruction for masking a result of the operation. Such an embodiment is further illustrated in FIG. 5 and FIG. 8. In an embodiment, execution circuitry 104 for executing a fused instruction operation for performing an operation and writing to a destination register a portion, corresponding to a specified mask bit sequence, of the operation result includes an operation circuit and a masking circuit. An example of such execution circuitry is illustrated in FIG. 5.

Figure 6A:
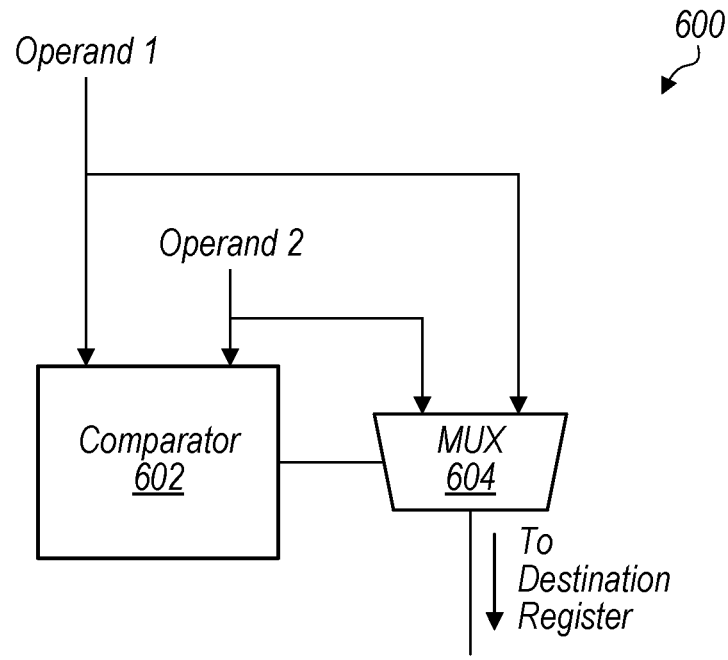
FIGS. 6A and 6B are block diagrams illustrating examples of execution circuitry for executing a fused compare with select or increment instruction operation, according to some embodiments.
Figure 6B:
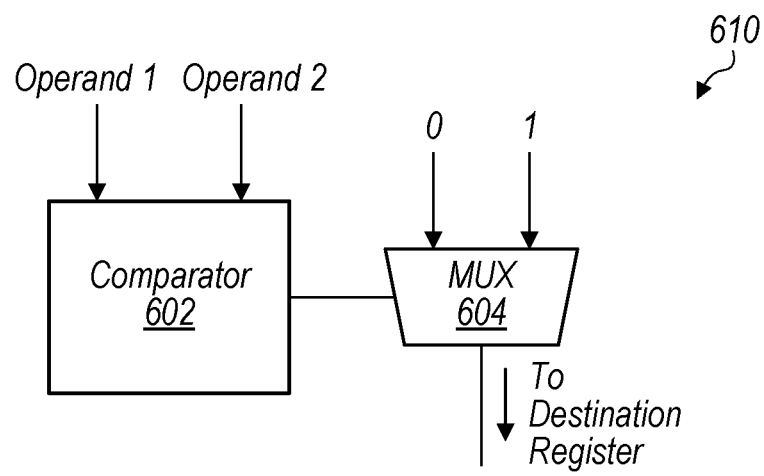

First instruction 108 may also be an instruction for comparing a first operand to a second operand in some embodiments, and second instruction 110 may be an instruction for writing a value to a destination register based on the first and second operands and a result of the comparison. Examples of this type of embodiment are further illustrated in FIG. 6A, FIG. 6B and FIG. 9. In an embodiment, execution circuitry 104 for executing a fused instruction operation for writing to a destination register based on a result of comparing the first and second operands includes a comparator and a multiplexer. Examples of such execution circuitry are illustrated in FIG. 6A and FIG. 6B.

Figure 4:
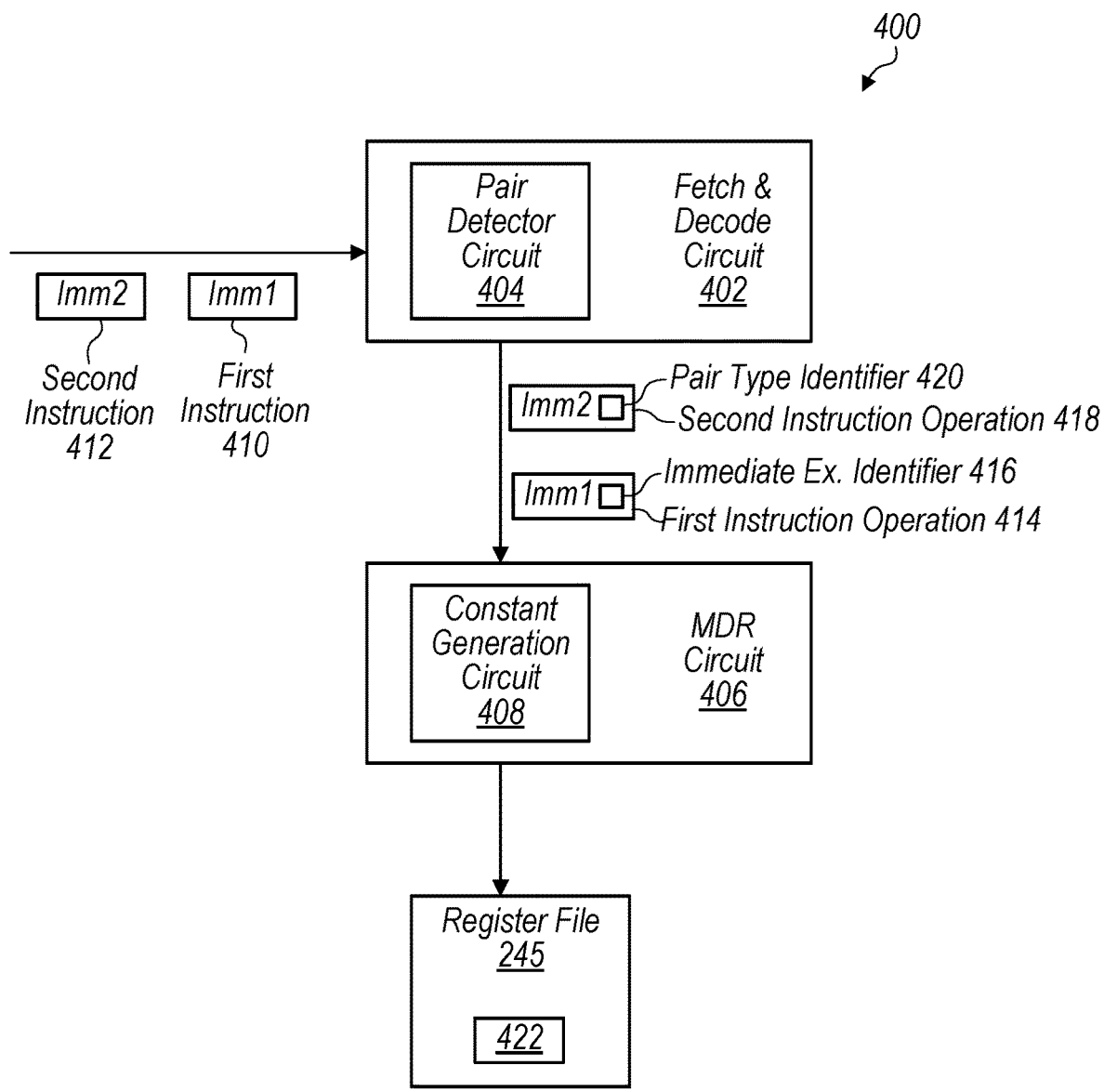
FIG. 4 is a block diagram illustrating example elements of a processor configured to fuse instructions for storing a high-bit-length constant value, according to some embodiments.

In some embodiments instruction pair 106 of FIG. 1 is executable to store into a destination register a constant value having a bit length larger than a width of an immediate value field of first instruction 108 or second instruction 110. In some further embodiments, first instruction 108 is one of a move/zero, move/negate, logical OR or logical XOR instruction, and second instruction 110 is a move/keep instruction. In some embodiments of instruction pairs for writing a high-bit-length constant value, first instruction 108 is an instruction to calculate a page address of a target page in memory and second instruction 110 is an instruction to add an offset value to the page address. Examples of this type of embodiment are further illustrated in FIG. 4 and FIG. 10. In an embodiment, execution circuitry 104 for obtaining first and second portions of a constant value from the first and second instructions and storing the first and second portions in a destination register includes a constant generation circuit. In some embodiments execution circuitry 104 includes execution logic within a map-dispatch-rename (MDR) circuit. Examples of such execution circuitry are illustrated in FIG. 2 and FIG. 4.

Figure 2:
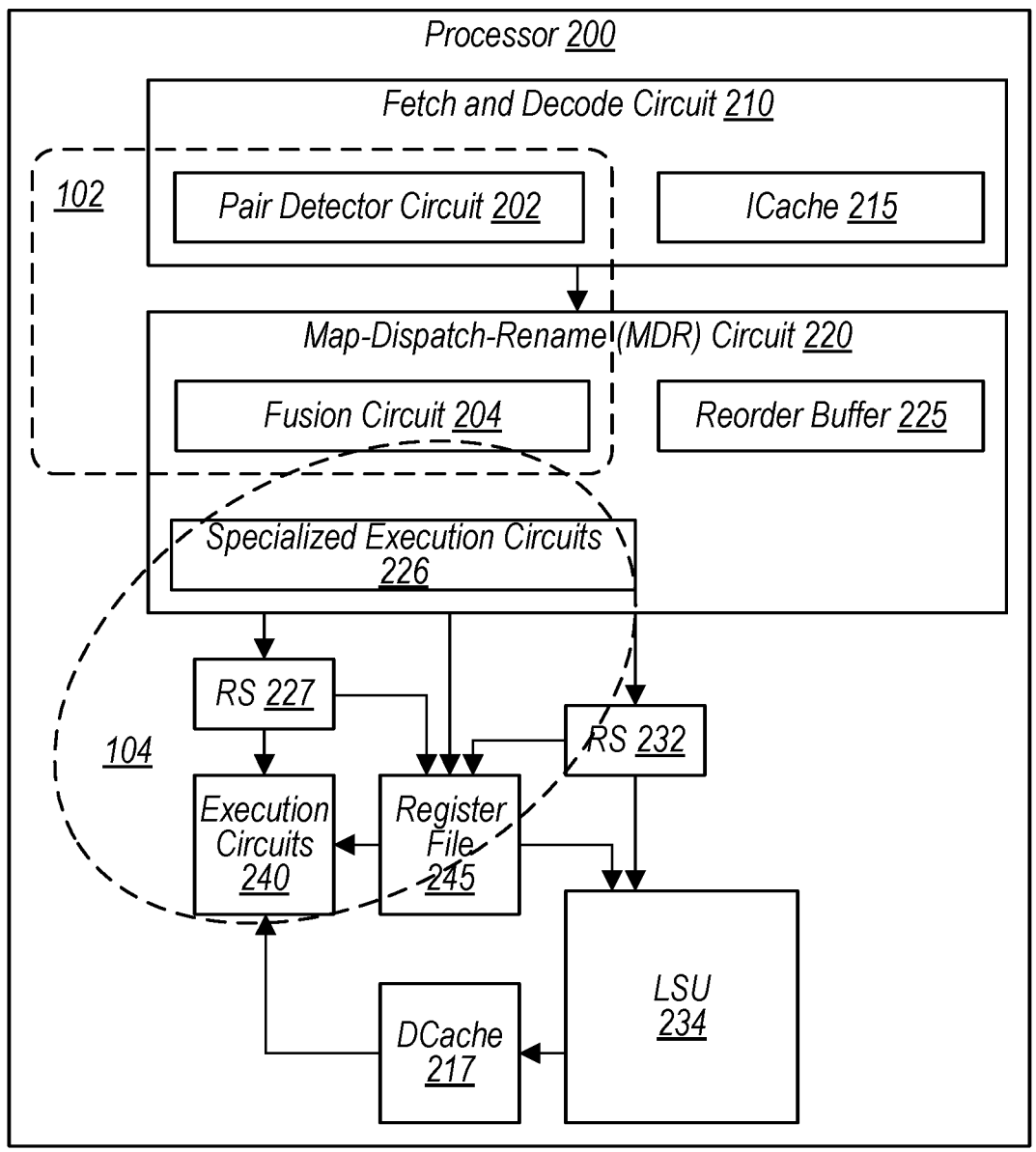
FIG. 2 is a block diagram illustrating additional example elements of a processor that is configured to fuse instructions, according to some embodiments.

Turning now to FIG. 2, additional example elements of a processor configured to fuse certain instruction pairs are shown. In the illustrated embodiment, processor 200 includes a fetch and decode circuit 210, a map-dispatch-rename (MDR) circuit 220, a set of reservation stations (RSs) 227 and 232, one or more execution units, or execution circuits, 240, a register file 245, a data cache, or "DCache", 217, and a load/store unit (LSU) 234. As depicted, fetch and decode unit, or fetch and decode circuit, 210 includes a pair detector circuit 202 and an instruction cache, or "ICache", 215 and is coupled to MDR unit, or MDR circuit, 220, which includes a reorder buffer 225, fusion circuit 204 and specialized execution circuits 226, and is coupled to RS 227 and LSU 234. More particularly, MDR circuit 220 is coupled to an RS 232 associated with LSU 234. RS 227 is coupled to execution circuits 240. As depicted, register file 245 is coupled to execution circuits 240 and LSU 234. Processor 200 may include multiple other elements not shown in FIG. 2, such as an external interface, or core interface for communicating with the rest of a system including processor 200.

Fetch and decode circuit 210, in various embodiments, is configured to fetch instructions for execution by processor 200 and decode the instructions into instruction operations (briefly "ops") for execution. More particularly, fetch and decode circuit 210 may be configured to cache instructions fetched from a memory (e.g., memory 1110 of FIG. 11) through an external interface into ICache 215, and may fetch a speculative path of instructions for processor 200. Fetch and decode circuit 210 may implement various prediction structures for predicting the fetch path, such as one that predicts fetch addresses based on previously executed instructions. As used herein an "instruction" is an executable entity defined in an ISA implemented by a processor such as processor 200. In various embodiments, fetch and decode circuit 210 may decode an instruction into multiple ops depending on the complexity of that instruction. Particularly complex instructions may be microcoded. In such embodiments, the microcode routine for an instruction may be coded in ops. In other embodiments, however, each instruction within the instruction set architecture implemented by processor 200 may be decoded into a single op, and thus the op can be synonymous with instruction (although it may be modified in form by the decoder). Accordingly, the term "instruction operation" or "op" may be used herein to refer to an operation that an execution circuit in the processor 200 is configured to execute as a single entity.

In various embodiments, fetch and decode circuit 210 is configured to identify candidate instructions for fusion and provide an indication of those candidate instructions to MDR circuit 220. Fetch and decode circuit 210 may scan across its decode lanes to search for particular combinations of instructions. Such combinations may include but are not limited to: a divide instruction and a multiply-subtract instruction; a compare instruction and a select or increment function; an arithmetic logic unit (ALU) instruction and a masking instruction; and a pair of instructions for producing a high-bit-length constant. In some embodiments conditions may be applied to determine whether an instruction pair is eligible for fusion. The instructions of a combination might not be eligible for fusion, for example, if the instructions are not sequential or otherwise within a specified instruction distance (e.g., three instructions) of each other in program order, or if the instructions fall within different batches of instructions ("instruction groups"). In various embodiments, fetch and decode circuit 210 marks eligible combinations (e.g., by setting bits of the instructions) and provides them to MDR circuit 220. In some embodiments, the fusion of those instructions occurs within fetch and decode circuit 210. Fusion detection circuitry 102 from FIG. 1 is shown in FIG. 2 as implemented using a combination of fetch and decode circuit 210 and MDR circuit 220.

ICache 215 and DCache 217, in various embodiments, may each be a cache having any desired capacity, cache line size, and configuration. A cache line may be allocated/deallocated in a cache as a unit and thus may define the unit of allocation/deallocation for the cache. Cache lines may vary in size (e.g., 32 bytes, 64 bytes, or larger or smaller). Different caches may have different cache line sizes. There may further be more additional levels of cache between ICache 215/DCache 217 and a main memory, such as a last level cache. In various embodiments, ICache 215 is used to cache fetched instructions and DCache 217 is used to cache data fetched or generated by processor 200.

MDR circuit 220, in various embodiments, is configured to map ops received from fetch and decode circuit 210 to speculative resources (e.g., physical registers) in order to permit out-of-order and/or speculative execution. As shown, MDR circuit 220 can dispatch the ops to RS 227 and RS 232 in LSU 234. The ops may be mapped to physical registers in register file 245 from the architectural registers used in the corresponding instructions. That is, register file 245 may implement a set of physical registers that are greater in number than the architectural registers specified by the instruction set architecture implemented by processor 200. Accordingly, MDR circuit 220 may manage a mapping between the architectural registers and the physical registers. In some embodiments, there may be separate physical registers for different operand types (e.g., integer, floating point, etc.). The physical registers, however, may be shared between different operand types in some embodiments. MDR circuit 220, in various embodiments, tracks the speculative execution and retires ops (or flushes misspeculated ops). In various embodiments, reorder buffer 225 is used in tracking the program order of ops and managing retirement/flush.

In various embodiments, MDR circuit 220 is configured to fuse eligible combination pairs that are marked by fetch and decode circuit 210 if certain criteria are met. While fusion of instructions occurs at MDR circuit 220 in various embodiments, in some embodiments, fusion occurs at a different stage in the instruction pipeline, such as at the instruction buffer or the instruction cache. That is, the fusion decoder circuitry used to perform the fusion of instructions may reside at different stages of the instruction pipeline in different implementations.

In the embodiment of FIG. 2, MDR circuit 220 also includes specialized execution circuits 226. An example of such a specialized execution circuit is constant generation circuit 408 of FIG. 4. In an embodiment, specialized execution circuits 226 are versions of execution logic also included in execution circuits 240. In various embodiments, execution of fused instruction operations may be performed by specialized execution circuits 226 in MDR circuit 220, by execution circuits 240, or by a combination of these. Execution circuitry 104 of FIG. 1 is shown in FIG. 2 as including one or both of specialized execution circuits 226 and execution circuits 240.

LSU 234, in various embodiments, is configured to execute memory ops received from MDR circuit 220. Generally, a memory op is an instruction operation specifying an access to memory (such as memory 1110 of FIG. 11), although that memory access may be completed in a cache such as DCache 217. As such, a load memory op may specify a transfer of data from a memory location to a register of processor 200, while a store memory op may specify a transfer of data from a register to a memory location. Load memory ops can be referred to as load ops or loads, and store memory ops can be referred to as store ops or stores. In various cases, the instruction set architecture implemented by processor 200 permits memory accesses to different addresses to occur out of order but may require memory accesses to the same address (or overlapping addresses, where at least one byte is accessed by both overlapping memory accesses) to occur in program order.

LSU 234 may implement multiple load pipelines ("pipes"). As an example, three load pipelines may be implemented, although more or fewer pipelines can be implemented in other cases. Each pipeline may execute a different load, independent and in parallel with other loads in other pipelines. Consequently, reservation station 232 may issue any number of loads up to the number of load pipes in the same clock cycle. Similarly, LSU 234 may further implement one or more store pipes. In some embodiments, the number of store pipes is not equal to the number of load pipes. For example, two store pipes may be used instead of three store pipes. Likewise, reservation station 232 may issue any number of stores up to the number of store pipes in the same clock cycle.

Load/store ops, in various embodiments, are received at reservation station 232, which may be configured to monitor the source operands of the load/store ops to determine when they are available and then issue the ops to the load or store pipelines, respectively. Some source operands may be available when the instruction operations are received at reservation station 232, which may be indicated in the data received by reservation station 232 from MDR circuit 220 for the corresponding instruction operation. Other operands may become available via execution of instruction operations by execution circuits 240 or even via execution of earlier load ops. The operands may be gathered by reservation station 232 or may be read from register file 245 upon issue from reservation station 232 as shown in FIG. 2. In some embodiments, reservation station 232 is configured to issue load/store ops out of order (from their original order in the code sequence being executed by processor 200) as the operands become available.

Execution circuits 240, in various embodiments, include any types of execution circuits. For example, execution circuits 240 may include integer execution circuits configured to execute integer ops, floating point execution circuits configured to execute floating point ops, or vector execution circuits configured to execute vector ops. Generally, integer ops are ops that perform a defined operation (e.g., arithmetic, logical, shift/rotate, etc.) on integer operands and floating-point ops are ops that have been defined to operate on floating point operands. Vector ops may be used to process media data (e.g., image data such as pixels, audio data, etc.). As such, each execution circuit 240 may comprise hardware configured to perform the operations defined for the ops that that execution circuit is defined to handle. Execution circuits 240 may generally be independent of each other in that each execution circuit may be configured to operate on an op that was issued to that execution circuit without dependence on other execution circuits 240. Different execution circuits 240 may have different execution latencies (e.g., different pipe lengths). Any number and type of execution circuits 240 may be included in various embodiments, including embodiments having one execution circuit 240 and embodiments having multiple execution circuits 240.

FIG. 3 is a block diagram illustrating an example of execution circuitry for executing a fused remainder instruction operation, according to some embodiments disclosed herein. As noted in connection with FIG. 1, one pair of instructions that may be advantageously fused is a pair including a divide instruction followed by an instruction for using the result of the divide operation to calculate the remainder of the division and overwrite the quotient with the remainder. In an embodiment, the pair of instructions is a pair of integer instructions. Such an instruction pair may be used by programmers using an ISA without a remainder, or modulo, instruction. A remainder or modulo operation can be useful for various computing applications, such as determining whether a number is even or odd or finding the current position in a wrap-around buffer. Execution circuitry 300 includes a divider circuit 302 and conversion circuit 304. Divider circuit 302 is configured to receive divisor 306 and dividend 308 and to produce quotient 310 and residual values 312. If circuitry 300 is used for execution of an instruction operation produced by decoding a conventional division instruction, quotient 310 is taken as the output and written to the destination register associated with the instruction. By contrast, if circuitry 300 is used for execution of a fused instruction operation for calculating a remainder, residual values 312 are converted using conversion circuit 304 to produce remainder 314, which is taken as the output and written to the destination register instead of quotient 310. In some embodiments, an additional register may be assigned to allow both quotient 310 and remainder 314 to be produced as outputs of circuitry 300.

In an embodiment, circuitry 300 is within execution circuitry 104 of FIG. 1, and divisor 306 and dividend 308 are included in fused instruction operation 112. Fused instruction operation 112 may also include an indicator, such as a value written to one or more bits of the instruction operation, that a remainder operation rather than a conventional division operation is to be performed. In this way circuitry 300 can be used to execute instruction operations for either conventional division operations or remainder operations.

Divider circuit 302 implements a division algorithm that produces one or more residual values related to the remainder of the division. In an embodiment, the division algorithm is an iterative subtractive algorithm. Such algorithms may be useful in low-power applications, for example. In one embodiment, a radix 4 algorithm is used, where a radix $2^n$ algorithm retires n bits of quotient in each iteration of the algorithm, but other radix values may be used in other embodiments. In some embodiments a non-restoring algorithm is used to reduce the number of cycles used by divider circuit 302 (as compared to when a restoring algorithm is used). The particular design of divider circuit 302 depends on the particular division algorithm used. In various embodiments, divider circuit 302 includes one or more barrel shifters, one or multiplexers and one or more adder circuits. In an embodiment, divider circuit 302 uses one or more Carry Save Adders (CSAs). In some embodiments, the division algorithm implemented by divider circuit 302 does not perform a multiplication operation, and divider circuit 302 does not include a multiplier circuit.

One or more residual values 312 are generated by divider circuit 302. Depending on the particular division algorithm used, residual values 312 will need to be modified and/or combined to produce the remainder of the division operation. For example, if a Carry Save Adder is used, residual values include separate carry and result components that have to be combined, and if a non-restoring algorithm is used, a restoration step for the remainder may be needed. In addition, shifting may be needed to account for shifting performed by divider circuit 302. Conversion circuit 304 performs the processing of residual values 312 needed to produce remainder 314. In an embodiment, conversion circuit 304 includes one or more barrel shifters and one or more adder circuits.

In an embodiment, remainder generation by conversion circuit 304 takes fewer cycles than execution of a separate instruction, such as a multiply-subtract instruction, to generate a remainder. In some embodiments, remainder generation by conversion circuit 304 is performed in a single cycle. Even for cases in which remainder generation using circuit 300 does not take fewer cycles than execution of a divide instruction followed by a separate remainder generation instruction, fusion of such an instruction pair into a fused remainder instruction operation may provide savings of power and other resources. For example, avoiding a multiply-subtract operation can save power because multiplier circuits can consume significant power. Reducing the number of instructions can improve efficiency by reducing demand on resources such as registers and re-order buffer entries, as noted above.

FIG. 4 is a block diagram illustrating example elements of a processor configured to fuse instructions for storing a high-bit-length constant value. Certain instructions defined by an ISA allow immediate values to be stored within the instruction so that operations involving constant values can be performed. A given ISA has a maximum length of immediate value that is supported, and a programmer may want to perform an operation using a constant value that is longer than will fit into an immediate field of a single instruction. Various ISA instruction pairs may be used in creating such a constant value. As an example, one such pair may include a move/zero instruction that can shift an immediate value, write it to a register and zero remaining bits of the register and a move/keep instruction that can write an immediate value to a register while keeping other bits unchanged. Such an instruction pair can be used to put the two immediate values (one from each of the two instructions) together into the same register to build a constant having a bit length defined by the sum of the immediate value field lengths of the two instructions. Another example of a pair that may be used to build a high-bit length constant is a pair having a move/negate instruction that can shift an immediate value, write it to a register and invert the result followed by a move/keep instruction. Still another example of such a pair includes a logical OR or exclusive-OR (XOR) as the first instruction followed by a move/keep instruction. An instruction pair that may be used to calculate large relative program counter jumps includes an instruction for calculating a page address of a target page in memory and writing it to a destination register followed by an add instruction for adding an offset value, within the target page, to the address in the destination register.

Instruction pairs such as those described above involve writing two constant values to parts of the same register, and may advantageously be combined, or fused, for execution. Processor 400 of FIG. 4 includes fetch and decode circuit 402, MDR circuit 406 and register file 245. Certain processor elements useful for explanation of this instruction fusion example are shown in FIG. 4; additional elements of a processor, including some of the elements shown in FIG. 2, have been omitted for clarity. Fetch and decode circuit 402 and MDR circuit 406 are similar to fetch and decode circuit 210 and MDR circuit 220 as described in connection with FIG. 2, but are specialized for detection and execution of instruction pairs for generating a high-bit-length constant value. In some embodiments, first instruction 410 includes an immediate value Imm1 and second instruction 412 includes an immediate value Imm2. In an embodiment, immediate values Imm1 and Imm2 are operands of first instruction 410 and second instruction 412, respectively. (In the case of an instruction pair for calculating a page address with an offset within the page, the first instruction may not include an immediate value as an operand, but the first instruction calculates an address written to part of a destination register and can be fused for execution with a second instruction for writing the offset to a different part of the destination register.)

Pair detector circuit 404 within fetch and decode circuit 402 is configured to identify instructions 410 and 412 as candidates for fusion (i.e., eligible for fusion). One criterion used by pair detector circuit 402 is that instructions 410 and 412 have the same destination register. For embodiments in which first instruction 410 is a logical OR or XOR instruction and second instruction 412 is a move/keep instruction, an additional criterion is that a source register for first instruction 410 is a zero register. For embodiments in which first instruction 410 calculates a page address of a target page in memory and second instruction 412 adds an offset value to the page address, additional criteria may include that the source and destination registers of second instruction 412 are the same as the destination register of first instruction 410 and that no shift is specified by second instruction 412. As discussed in connection with FIG. 2, additional criteria may also be used in identifying eligible instructions for fused execution, such as whether the instructions are consecutive or both within a group of instructions such as a dispatch group.

When instructions 410 and 412 are identified by fetch and decode circuit 402 as eligible for fused execution, they are marked so that MDR circuit 406 can recognize the corresponding instruction operations 414 and 418 as candidates for fused execution. In the embodiment of FIG. 4, first instruction operation 414 is associated with an immediate execution identifier 416. Although illustrated as within first instruction operation 414, immediate execution identifier 416 may be passed from fetch and decode circuit 402 to MDR circuit 406 in a different packet or payload, and associated with first instruction operation 414 using, for example, the decode lane of instruction operation 414. Immediate execution identifier 416 signals to MDR circuit 406 that instruction operation 414 is a candidate for immediate execution, or generation of the intended constant value using logic in MDR circuit 406 rather than execution by the processor's normal execution pipeline. In an embodiment, identifier 416 also indicates a type of first instruction in the eligible instruction pair (such as move/zero, move/negate, OR or XOR, page address, etc.).

Second instruction operation 418 is associated with a pair type identifier 420. In a similar manner as described for identifier 416, pair type identifier 420 may be passed from fetch and decode circuit 402 to MDR circuit 406 in a packet or payload other than second instruction operation 418 and associated with second instruction operation 418 using, for example, the decode lane of instruction operation 418. Pair type identifier 420 indicates the type of second instruction in the eligible instruction pair (such as move/keep or add). Identifiers 416 and 420 form one example of how an instruction pair eligible for fused execution to create a high-bit-length constant value can be marked; other ways of identifying eligible instruction pairs to an MDR circuit may be used in other embodiments.

MDR circuit 406 may for one or more eligible instruction pairs generate, using constant generation circuit 408, the constant that would be created by normal execution of the instruction pair. In an embodiment, a limited number of eligible instruction pairs within a designated group of instructions such as a dispatch group can be executed using constant generation circuit 408. The number of eligible instruction pairs that can be executed using constant generation circuit 408 may be limited by a number of write ports between MDR circuit 406 and register file 245, for example. In an embodiment, MDR circuit 406 selects an eligible first instruction operation, such as first instruction operation 414, for immediate execution using constant generation circuit 408 and then checks for a corresponding eligible second instruction operation forming an eligible pair. In an embodiment, MDR circuit 406 checks an adjacent decode lane for the second instruction operation. Checking for a corresponding second instruction operation may include checking types of operation, source and destination registers and/or instruction group boundaries in various embodiments.

Eligible instruction operation pairs selected for immediate execution by MDR circuit 406 are executed using constant generation circuit 408. Constant generation circuit 408 includes logic configured to perform the operations specified by the corresponding instructions, including, for example, any shifts, negations, OR or XOR operations, address calculations or adds, along with writes to the destination register. Writes to register file 245 may be performed via one or more side ports from MDR circuit 408 to register file 245, rather than via the processor's execution pipeline. In an embodiment, logic within constant generation circuit 408 is similar to logic in other execution circuitry of the processor such as execution circuits 240 of FIG. 2, where this execution circuitry performs the same operations for instruction operations that are sent through the normal execution pipeline instead of being executed using constant generation circuit 408. Execution of the instruction operations by constant generation circuit 408 results in writing of constant values obtained from the first and second instruction operations to register file 245 to form constant value 422, where creation of value 422 in register file 245 is the same result that normal execution of the original instruction pair in the execution pipeline would have produced. In some embodiments, execution of the instruction operations by constant generation circuit 408 includes writing of immediate values Imm1 and Imm2 to register file 245 to form constant value 422. Generation of constant value 422 using constant generation circuit 408 can be significantly faster than waiting for the same value to be generated using the execution pipeline.

When an eligible instruction operation pair is executed using constant generation circuit 408, the instruction operations in the pair are not dispatched from MDR circuit 406; they are not sent to a reservation station such as RS 227 or RS 232 in FIG. 2 and do not enter the execution pipeline. Fusing of the pair of instruction operations for immediate execution in MDR circuit 406 can result in benefits including reduced latency, reduced power consumption, and improved operation efficiency. In some embodiments, fused execution of instruction pairs having a move/keep instruction as the second instruction could be extended to fused execution of larger groups of instructions having additional move/keep instructions as third (or fourth, or more) instructions for creating larger constant values. Such extension would increase complexity of the logic in constant generation circuit 408, however, and could increase the latency such that use of blocking conditions to prevent reading of a constant value before it is completely generated becomes necessary. Although not shown in FIG. 4, MDR circuit 406 is coupled to one or more execution pipelines for execution of instruction operations not executed using constant generation circuit 408. Such execution pipelines may include reservation stations and execution circuits such as those shown in FIG. 2.

FIG. 5 is a block diagram illustrating example elements of a processor configured to fuse instructions for selecting a portion of an operation result. Computer programs may include situations in which one instruction performs an operation, such as an arithmetic operation, and writes the result to a register but only a portion of the result is actually needed for further processing. For example, only the lower 8 bits of a value having 16 or more bits might be needed, or the lower 16 bits of a value having 32 or more bits, or the top 8 of the lower 16 bits of a value. If the ISA being used does not allow for portions of a register to be read, a programmer may obtain the needed part of a result using a pair of instructions in which the first instruction performs an operation and writes the result of the operation to a register and the second instruction reads the result and performs a masking operation to select the needed portion. The first instruction may be, for example, an add instruction or an instruction for performing some other operation. The second instruction may perform a logical AND operation between the result of the first instruction and a mask bit sequence. The mask bit sequence could be, for example, a hexadecimal FF corresponding to "1" values for the lowest 8 bits, a hexadecimal FF00 corresponding to "1" values for the top 8 of the lower 16 bits, or a hexadecimal FFFF corresponding to "1" values for the lowest 16 bits.

Instruction pairs for selecting a portion of an operation result may advantageously be fused for execution as a single fused instruction operation. Processor 500 of FIG. 5 includes fetch and decode circuit 502, MDR circuit 506 and execution circuit 510. Certain processor elements useful for explanation of this instruction fusion example are shown in FIG. 5; additional elements of a processor, including some of the elements shown in the example of FIG. 2, have been omitted for clarity. Fetch and decode circuit 502 and MDR circuit 506 are similar to fetch and decode circuit 210 and MDR circuit 220 as described in connection with FIG. 2, but are specialized for detection and execution of instruction pairs for selecting a portion of a result of an operation. In an embodiment, execution circuit 510 is within a group of execution circuits for the processor, such as execution circuits 240 of FIG. 2. First instruction 516 implements an operation Op1, which may include an addition operation, a subtraction operation, or some other arithmetic, logical or bitwise operation. In an embodiment, first instruction 516 implements an operation that may be carried out by an arithmetic logic unit (ALU) of a processor. Second instruction 518 includes a mask bit sequence Mask2, such as one of the mask bit sequence examples given above, for use in selecting a portion of the result of the operation of first instruction 516.

Pair detector circuit 504 within fetch and decode circuit 502 is configured to identify pairs of fetched instructions eligible for fusion into an instruction operation for selecting a portion of an operation result. In determining whether first instruction 516 and second instruction 518 are eligible for fusion, one criterion that may be used by pair detector circuit 504 is that the source and destination registers of second instruction 518 are the same as the destination register of first instruction 516. Pair detector circuit 504 may also look for one or more commonly used operations as the operation Op1 performed by first instruction 516, and/or for one or more commonly used mask bit sequences as the mask bit sequence Mask2 used in second instruction 518. Other criteria may also be used in identifying eligible instructions for fused execution, such as whether the instructions are consecutive or both within a group of instructions such as a dispatch group.

In an embodiment, when instructions 516 and 518 are identified by fetch and decode circuit 502 as eligible for fusion, they are marked so that MDR circuit 506 can recognize the corresponding instruction operations 520 and 524 as fusion candidates. In the embodiment of FIG. 5, first instruction operation 520 is associated with a fusion indicator 522. Although illustrated as within first instruction operation 520, fusion indicator 522 may be passed from fetch and decode circuit 502 to MDR circuit 506 in a different packet or payload, and associated with first instruction operation 520 using, for example, the decode lane of instruction operation 520. Fusion indicator 522 signals to MDR circuit 506 that instruction operation 520 is a candidate for fusing with a masking instruction for selection of a portion of the result produced by instruction operation 520.

Second instruction operation 524 is associated with a mask value indicator 526. In a similar manner as described for indicator 522, mask value indicator 526 may be passed from fetch and decode circuit 502 to MDR circuit 506 in a packet or payload other than second instruction operation 524 and associated with second instruction operation 524 using, for example, the decode lane of instruction operation 524. Mask value indicator 526 identifies the mask bit sequence applied by second instruction operation 524. In an embodiment, a limited number of commonly-used mask bit sequences are supported for fusion in processor 500, and mask value indicator 526 represents one of those mask bit sequences using fewer bits than the number of bits in the actual mask bit sequence being implemented. Indicators 522 and 526 form one example of how an instruction pair eligible for fusion into a fused instruction operation for selecting a portion of an operation result can be marked; other ways of identifying eligible instruction pairs to an MDR circuit may be used in other embodiments.

For one or more eligible instruction pairs, MDR circuit 506 may fuse, using fusion circuit 508, the corresponding first and second instruction operations into a single fused instruction operation such as fused instruction operation

528. In an embodiment, determination by MDR circuit 506 of whether to fuse an eligible instruction pair includes checking an availability of execution circuitry configured to execute a fused instruction operation. In the embodiment of FIG. 5, fused instruction operation 528 is associated with mask value indicator 526. Although illustrated as within fused instruction operation 528, mask value indicator 526 may be passed from MDR circuit 506 to execution circuit 510 using a different packet or payload. In an embodiment, an additional element such as a reservation station (not shown) between MDR circuit 506 and execution circuit 510 is configured to issue fused instruction operation 528 to execution circuit 510 for execution and to issue other instruction operations to other execution circuits (not shown).

Operation circuit 512 within execution circuit 510 is configured to perform operation Op1 during execution of fused instruction operation 528. Masking circuit 514 is configured to mask a portion of the result of operation circuit 512, or to otherwise select the portion of the operation result corresponding to a masking operation using a mask with bit sequence Mask2. In an embodiment, mask bit sequence Mask2 is implemented in masking circuit 514 rather than being provided with fused instruction operation 528. Mask value indicator 526 may serve to identify to execution circuit 510 which of certain predetermined mask bit sequences is needed, so that the appropriate masking circuit is used. In an embodiment, logic within execution circuit 510 is similar to logic in other execution circuitry of the processor (not shown in FIG. 5), where the other execution circuitry performs the same operations or masking during separate executions of non-fused instruction operations. Although shown in FIG. 5 as a part of execution circuit 510, masking circuit 514 can be implemented in the forwarding network of the processor in some embodiments, between the execution and write stages of the execution pipeline.

Execution of fused instruction operation 528 using execution circuit 510 results in a single write to the destination register of the portion of the operation result selected by the masking operation. Such execution avoids writing of the full operation result value to the destination register when executing first instruction 516, then reading of the full value from the destination register when executing second instruction 518. Fusion of the instruction pair therefore may reduce latency as well as providing the other resource savings associated with having one instruction operation rather than two dispatched from MDR circuit 506.

FIG. 5 illustrates an example implementation of instruction fusion for selecting a portion of an operation result; multiple possible alternatives and variations will be understood by one of ordinary skill in the art of processor design in view of this disclosure. In one embodiment, for example, different execution circuits having different masking circuits correspond to different values of mask value indicator 526, and fused instruction operation 528 is routed to the appropriate execution circuit based on indicator 526. In another embodiment, execution circuit 510 includes a single operation circuit 512 coupled to multiple masking circuits, with each masking circuit corresponding to a different value of mask value indicator 526. In some embodiments, operation circuit 512 is also used for execution of non-fused instruction operations, with masking circuit 514 employed in the case of fused instruction operations. In other embodiments, one or more separate operation circuits are used for execution of non-fused instruction operations, and execution circuit 510 is dedicated to execution of fused instruction operations.

FIGS. 6A and 6B are block diagrams illustrating examples of execution circuitry for executing a fused compare with select or increment instruction operation. In an embodiment, execution circuitry 600 and 610 are within a group of execution circuits for a processor, such as execution circuits 240 of FIG. 2. Programmers in some cases want to compare two operands and write one of the operands to a destination register depending on a result of the comparison. A programmer may also want to compare two operands and write one of two constants, such as a "0" or "1", to a destination register as a result of the comparison. In some ISAs each of these operations involves piecing together two instructions: one to perform the comparison and set one or more condition or status bits in a status register indicating a result of the comparison, and one to write the appropriate value to the destination register based on values of the condition bits. By providing execution circuitry having a multiplexor to select the appropriate value based on the result of a comparison circuit, these pairs of instructions can be fused for execution as fused instruction operations. Execution circuitry 600 of FIG. 6A includes a comparator 602 and a multiplexor 604. Comparator 602 is configured to compare two operands Operand1 and Operand2 and provide one or more control signals to multiplexor 604 indicating which of the operands is larger. Multiplexor 604 is configured to send one of the two operands to the destination register. In an embodiment, multiplexor 604 is configured to send the larger of the two operands to the destination register. Execution circuitry 610 of FIG. 6B is configured so that multiplexor 604 writes a "0" or "1" value to the destination register depending on which of the two operands is larger.

In an embodiment, operands Operand1 and Operand2 are brought to execution circuitry 600 by a fused instruction operation for comparing two operands and writing one of the operands to a destination register based on a result of the comparison. The fused instruction operation may be generated, in some embodiments, using a processor similar to processor 500 of FIG. 5, except that the processor has a fetch and decode circuit and an MDR circuit configured for detection and fusing of a comparison/selection instruction pair as described above rather than the operation/masking instruction pair of FIG. 5. The first instruction of an eligible pair of instructions for fusing is an instruction for performing a comparison of Operand1 and Operand2. Operand1 and Operand2 may be values from two source registers for the first instruction or may include an immediate value and a value from a register. The first instruction is executable to perform various types of comparison in various embodiments, such as comparing the two operands or comparing one operand to the negative of the other operand. The first instruction is further executable to set one or more condition or status bits depending on a result of the comparison.

The second instruction of an eligible pair of instructions for fusing is an instruction for writing a value to a destination register based on values of condition bits set by the first instruction. In some embodiments, the second instruction is a conditional select instruction for writing either Operand1 or Operand2 to the destination register depending on the condition bit values. In some embodiments, the second instruction is a conditional increment instruction that is executable to increment the value of an operand by "1" and write either the incremented value or another operand value to the destination register, depending on the condition bit values. Such a conditional increment instruction may be used with zero register operands in some embodiments to result in writing either "0" or "1" to the destination register depending on the condition bit values.

In a manner similar to that shown in FIG. 5 for fusion of an operation/masking instruction pair, a fetch and decode circuit configured for detection of eligible comparison/selection instruction pairs can decode the first instruction and associate a fusion indicator with a corresponding first instruction operation. Such a fetch and decode circuit can associate with a second instruction operation corresponding to the second instruction an indicator of the type of value written by the second instruction operation (for example, one of the operands compared by the first operation or a "0" or "1" value). Such indicators associated with the instruction operations can be used by an MDR circuit to recognize eligible instruction pairs. The MDR circuit can fuse one or more of the eligible pairs into a fused instruction operation that is dispatched to execution circuitry such as circuitry 600 or circuitry 610.

In an embodiment, logic within execution circuitry 600 and 610 is similar to logic in other execution circuitry of the processor, where the other execution circuitry performs the same comparison or conditional writing to a register during separate executions of non-fused instruction operations. In some embodiments, comparator 602 in execution circuitry 600 and 610 is also used for execution of non-fused comparison instruction operations, with multiplexor 604 employed in the case of fused instruction operations. In other embodiment, one or more separate comparator circuits are used for execution of non-fused instruction operations, and execution circuitry 600 and 610 are dedicated to execution of fused instruction operations. Execution of a fused compare and conditional write instruction operation using execution circuitry 600 or 610 results in writing of the appropriate value to a destination register without waiting for condition codes to be set and checked. This fused execution may reduce latency as well as providing the other resource savings associated with having one instruction operation rather than two dispatched to the execution circuitry.

Figure 7:
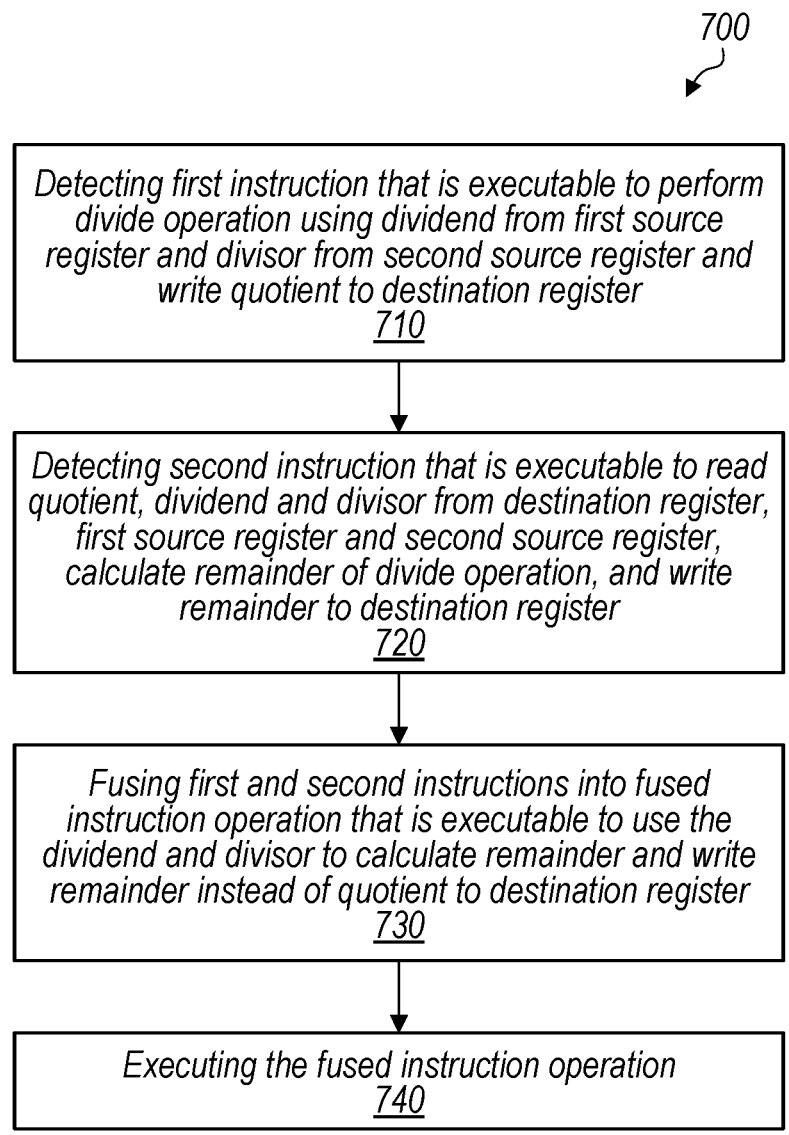
FIG. 7 is a flow diagram illustrating an example method relating to generating and executing an instruction operation that fuses a divide instruction with a remainder instruction, according to some embodiments.

FIG. 7 is a flow diagram illustrating an example method relating to fusing and executing a divide instruction with a multiply-subtract instruction. Method 700 is one embodiment of a method performed by a processor, such as processor 200 of FIG. 2. Other embodiments of such a method may include more or fewer blocks than shown in FIG. 7. Method 700 includes, in block 710, detecting a first instruction that is executable to perform a divide operation using a dividend from a first source register and a divisor from a second source register and write the resulting quotient to a destination register. The method further includes, in block 720, detecting a second instruction that is executable to read the quotient, dividend and divisor from the destination register, first source register and second source register, calculate a remainder of the divide operation, and write the remainder to the destination register. In an embodiment, the second instruction is a multiply-subtract instruction that is executable to calculate the remainder by multiplying the quotient and divisor together and subtracting the result from the dividend. The second instruction is executable, in some embodiments, to overwrite the quotient by writing the remainder to the destination register. In an embodiment, detecting the first and second instructions is performed at a fetch and decode circuit of a processor, such as fetch and decode circuit 210 of FIG. 2. Detecting the first and second instructions may be performed by a pair detector circuit such as pair detector circuit 202 of FIG. 2 in some embodiments.

In an embodiment, the first and second instructions are defined by an ISA used by the processor.

Method 700 further includes, at block 730, fusing the first and second instructions into a fused instruction operation executable to use the dividend and divisor to calculate the remainder of the division operation and write the remainder to the destination register instead of the quotient. In an embodiment, fusing the first and second instructions is performed at an MDR circuit of a processor, such as MDR circuit 220 of FIG. 2. Fusing the first and second instructions may be performed by a fusion circuit such as fusion circuit 204 of FIG. 2 in some embodiments. In an embodiment, fusing the first and second instructions is done only if certain merge conditions are satisfied. One such condition is that the first instruction is executable to retain the dividend and divisor by not overwriting the first or second source registers. Another condition, in some embodiments, is that the destination register of the second instruction is the same as the destination register of the first instruction. Another such condition is that each of the destination register and first and second source registers of the first instruction are source registers of the second instruction. As discussed in connection with FIG. 2, additional criteria may also be used in identifying eligible instructions for fused execution, such as whether the instructions are consecutive or both within a group of instructions such as a dispatch group. The method further includes, at block 740, executing the fused instruction operation. In an embodiment, executing the fused instruction operation is performed by execution circuitry such as circuitry 300 of FIG. 3.

In some embodiments, method 700 may further include decoding of the first and second instructions into corresponding first and second instruction operations and associating one or more of the first and second instruction operations with an indicator of eligibility for fused execution. Such an indicator of eligibility may in some embodiments signal to a fusion circuit such as fusion circuit 204 of FIG. 2 that the first and second instruction operations are eligible for fusing into the fused instruction operation. In an embodiment, the decoding and/or associating is performed by a fetch and decode circuit such as fetch and decode circuit 210 of FIG. 2. In various embodiments, checking for merge conditions such as those described above may be performed by either or both of a fetch and decode circuit determining whether the first and second instructions are eligible for fusing or an MDR circuit determining whether to fuse an eligible pair of instruction operations. Such a fetch and decode circuit and MDR circuit may be similar to fetch and decode circuit 502 and MDR circuit 506 of FIG. 5, except that the fetch and decode circuit and MDR circuit would be configured for detection and fusion of a divide/remainder instruction pair as described above rather than the operation/masking instruction pair of FIG. 5.

Figure 8:
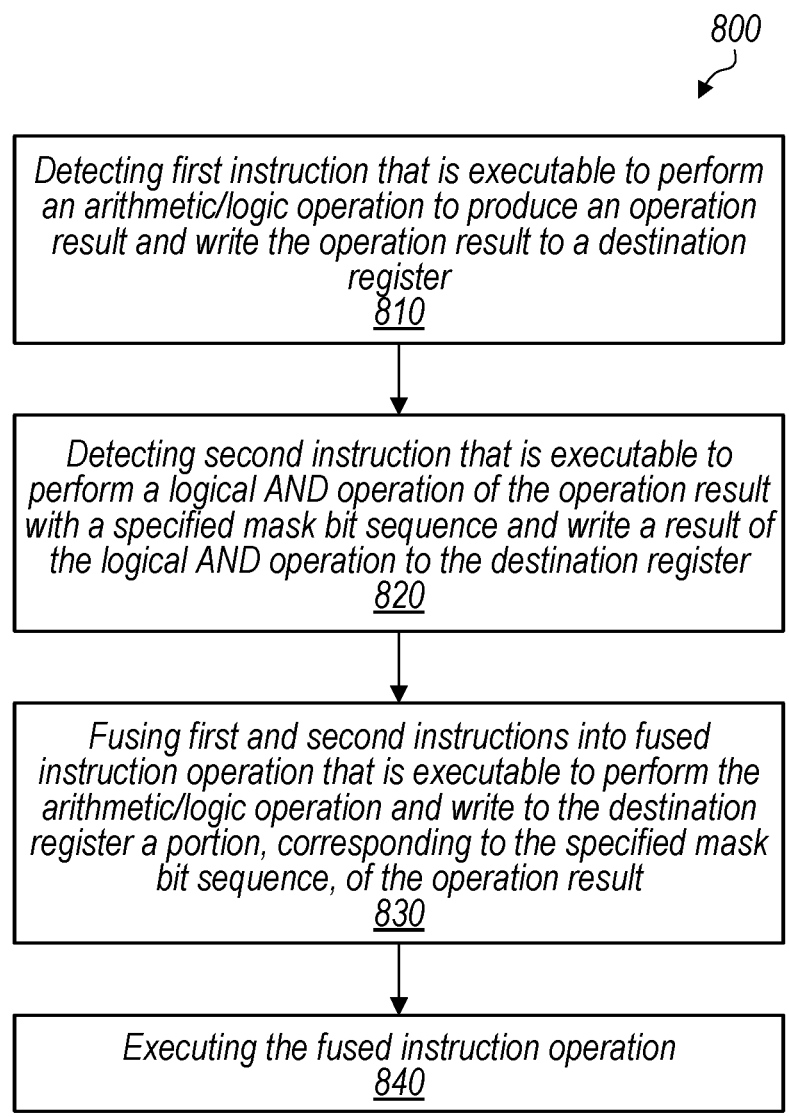
FIG. 8 is a flow diagram illustrating an example method relating to generating and executing an instruction operation that fuses an ALU instruction with a masking instruction, according to some embodiments.

FIG. 8 is a flow diagram illustrating an example method relating to fusing and executing an ALU instruction with a masking instruction. Method 800 is one embodiment of a method performed by a processor, such as processor 200 of FIG. 2 or processor 500 of FIG. 5. Other embodiments of such a method may include more or fewer blocks than shown in FIG. 8. Method 800 includes, at block 810, detecting a first instruction that is executable to perform an arithmetic/logic operation to produce an operation result and write the operation result to a destination register. An arithmetic/logic operation as used herein is an operation that may be carried out by an ALU, such as an arithmetic instruction (e.g., addition, multiplication, etc.), a logic instruction (e.g., a logical AND, OR or XOR) or a bitwise shift or rotate instruction. An example of a first instruction that may be detected at block 810 is first instruction 516 of FIG. 5.

The method further includes, at block 820, detecting a second instruction that is executable to perform a logical AND operation of the operation result with a specified mask bit sequence and write a result of the logical AND operation to the destination register. This type of instruction may be referred to as a "masking instruction" herein. An example of a second instruction that may be detected at block 820 is second instruction 518 of FIG. 5. In an embodiment, detecting the first and second instructions is performed at a fetch and decode circuit of a processor, such as fetch and decode circuit 502 of FIG. 5. Detecting the first and second instructions may be performed by a pair detector circuit such as pair detector circuit 504 of FIG. 5 in some embodiments. In an embodiment, the first and second instructions are defined by an ISA used by the processor.

Method 800 further includes, at block 830, fusing the first and second instructions into a fused instruction operation that is executable to perform the arithmetic/logic operation and write to the destination register a portion, corresponding to the specified mask bit sequence, of the operation result. In an embodiment, fusing the first and second instructions is performed at an MDR circuit of a processor, such as MDR circuit 506 of FIG. 5. Fusing the first and second instructions may be performed by a fusion circuit such as fusion circuit 508 of FIG. 5 in some embodiments. In an embodiment, fusing the first and second instructions is done only if certain merge conditions are satisfied. One such condition is that both a source register and the destination register of the second instruction are the same as the destination register of the first instruction. Another condition, in some embodiments, is that a mask bit sequence carried as an immediate value by the second instruction matches a mask bit sequence that execution circuitry for fused instruction operations is configured to implement. The method further includes, at block 840, executing the fused instruction operation. In an embodiment, executing the fused instruction is performed by execution circuitry such as execution circuit 510 of FIG. 5.

In some embodiments, method 800 may further include decoding of the first and second instructions into corresponding first and second instruction operations such as first instruction operation 520 and second instruction operation 524 of FIG. 5. The method may further include associating one or more of the first and second instruction operations with an indicator of eligibility for fused execution, such as fusion indicator 522 or mask value indicator 526 of FIG. 5. Such an indicator of eligibility may in some embodiments signal to a fusion circuit such as fusion circuit 508 of FIG. 5 that the first and second instruction operations are eligible for fusing into the fused instruction operation. In an embodiment, the decoding and/or associating is performed by a fetch and decode circuit such as fetch and decode circuit 502 of FIG. 5. In various embodiments, checking for merge conditions such as those described above may be performed by either or both of a fetch and decode circuit, such as fetch and decode circuit 502, determining whether the first and second instructions are eligible for fusing or an MDR circuit, such as MDR circuit 506 of FIG. 5, determining whether to fuse an eligible pair of instruction operations.

Figure 9:
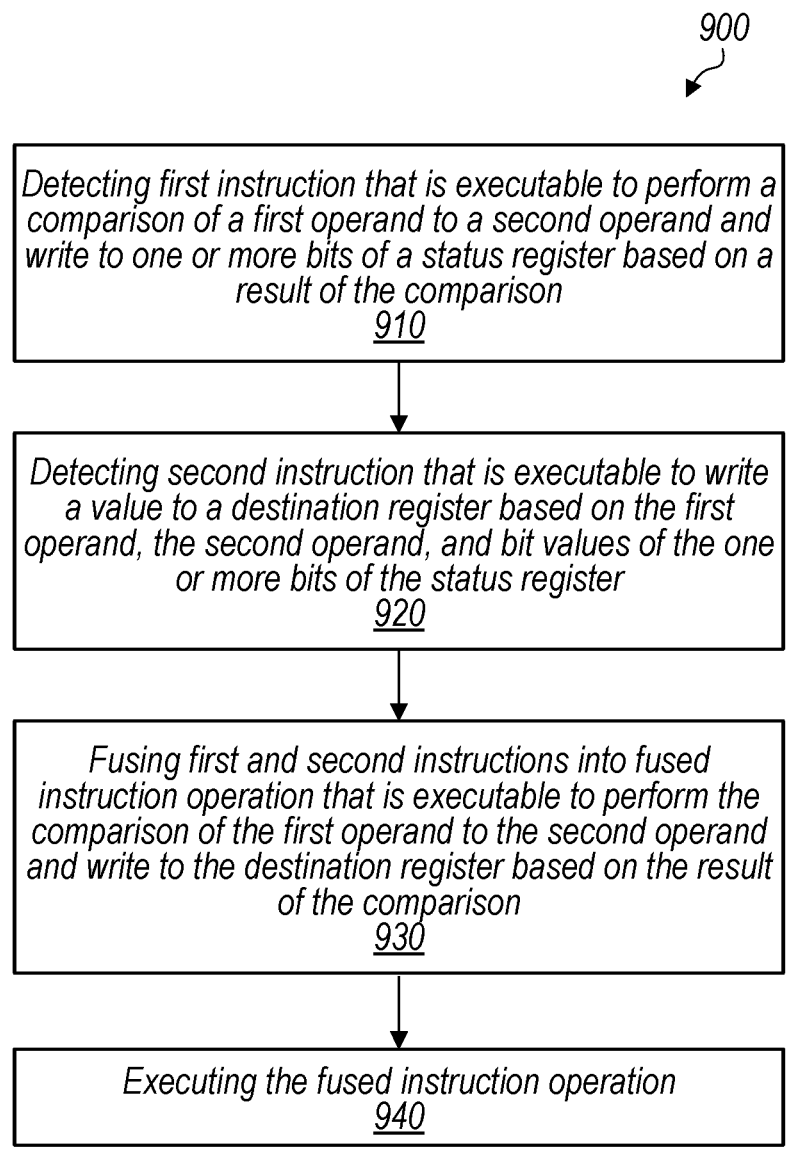
FIG. 9 is a flow diagram illustrating an example method relating to generating and executing an instruction operation that fuses a compare instruction with an instruction for writing to a register based on a result of the comparison, according to some embodiments.

FIG. 9 is a flow diagram illustrating an example method relating to fusing and executing a compare instruction with an instruction for writing to a register based on a result of the comparison. Method 900 is one embodiment of a method performed by a processor, such as processor 200 of FIG. 2.

Other embodiments of such a method may include more or fewer blocks than shown in FIG. 9. Method 900 includes, in block 910, detecting a first instruction that is executable to perform a comparison of a first operand to a second operand and write to one or more bits of a status register based on a result of the comparison. In an embodiment, the one or more bits of the status register include condition code bits, or "flags." The method further includes, in block 920, detecting a second instruction that is executable to write a value to a destination register based on the first operand, the second operand, and bit values of the one or more bits of the status register.

In some embodiments, the second instruction is a conditional select instruction configured to write either the first operand or the second operand to the destination register depending on the bit values of the status register bits. As an example, the larger of the two operands may be written to the destination register. In some embodiments, the second instruction is a conditional increment instruction configured to increment the value of an operand and write either the incremented value or another operand value to the destination register, depending on the bit values of the status register bits. The second instruction may be a conditional increment instruction configured to increment the value of an operand by "1". Such a conditional increment instruction may be used with zero register operands in some embodiments to result in writing either "0" or "1" to the destination register depending on the condition bit values. In an embodiment, detecting the first and second instructions is performed at a fetch and decode circuit of a processor, such as fetch and decode circuit 210 of FIG. 2. Detecting the first and second instructions may be performed by a pair detector circuit such as pair detector circuit 202 of FIG. 2 in some embodiments. In an embodiment, the first and second instructions are defined by an ISA used by the processor.

Method 900 further includes, at block 930, fusing the first and second instructions into a fused instruction operation executable to perform the comparison of the first operand to the second operand and write to the destination register based on the result of the comparison. In an embodiment, fusing the first and second instructions is performed at an MDR circuit of a processor, such as MDR circuit 220 of FIG. 2. Fusing the first and second instructions may be performed by a fusion circuit such as fusion circuit 204 of FIG. 2 in some embodiments. In an embodiment, fusing the first and second instructions is done only if certain merge conditions are satisfied. One such condition may be that the status register bits used by the second instruction were last written to by the first instruction, and not by any intervening instruction. Another condition, in an embodiment in which the second instruction is a conditional select instruction, is that the two operands compared in the first instruction are also operands for the second instruction. In an embodiment in which the second instruction is executable to write a "0" or "1" value, a condition for fusing may be that the second instruction has two zero-register source registers. As discussed in connection with FIG. 2, additional criteria may also be used in identifying eligible instructions for fused execution, such as whether the instructions are consecutive or both within a group of instructions such as a dispatch group. The method further includes, at block 940, executing the fused instruction operation. In an embodiment, executing the fused instruction operation is performed by execution circuitry such as circuitry 600 of FIG. 6A (for an embodiment having a conditional select instruction as the second instruction) or circuitry 610 of FIG. 6B (for an embodiment having a conditional increment instruction as the second instruction).

In some embodiments, method 900 may further include decoding of the first and second instructions into corresponding first and second instruction operations and associating one or both of the first and second instruction operations with an indicator of eligibility for fused execution. Such an indicator of eligibility may in some embodiments signal to a fusion circuit such as fusion circuit 204 of FIG. 2 that the first and second instruction operations are eligible for fusing into the fused instruction operation. In an embodiment, this decoding and/or associating is performed by a fetch and decode circuit such as fetch and decode circuit 210 of FIG. 2. In various embodiments, checking for merge conditions such as those described above may be performed by either or both of a fetch and decode circuit determining whether the first and second instructions are eligible for fusing or an MDR circuit determining whether to fuse an eligible pair of instruction operations. Such a fetch and decode circuit and MDR circuit may be similar to fetch and decode circuit 502 and MDR circuit 506 of FIG. 5, except that the fetch and decode circuit and MDR circuit would be configured for detection and fusion of a compare/conditional write instruction pair as described above rather than the operation/masking instruction pair of FIG. 5.

Figure 10:
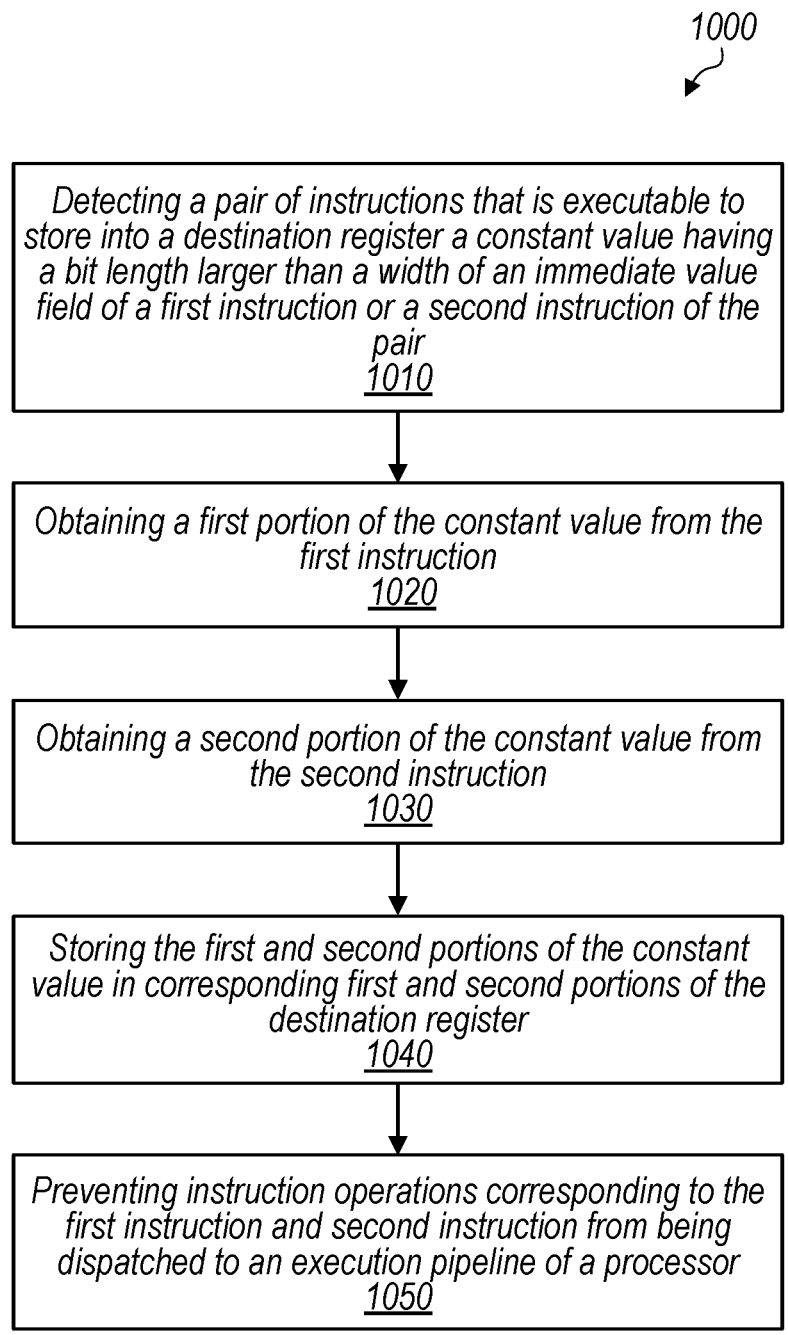
FIG. 10 is a flow diagram illustrating an example method relating to fusing instructions for storing a high-bit-length constant value, according to some embodiments.

FIG. 10 is a flow diagram illustrating an example method relating to fusing instructions for storing a high-bit-length constant value. Method 1000 is one embodiment of a method performed by a processor, such as processor 400 of FIG. 4. Other embodiments of such a method may include more or fewer blocks than shown in FIG. 10. Method 1000 includes, at block 1010, detecting a pair of instructions executable to store into a destination register a constant value having a bit length larger than a width of an immediate value field of a first instruction or a second instruction of the pair. An example of instructions forming such an instruction pair are first instruction 410 and second instruction 412 of FIG. 4. Various types of instruction pairs may be used for generation of a high-bit-length constant value in this manner, as discussed further in connection with FIG. 4. In an embodiment, detecting the pair of instructions is performed at a fetch and decode circuit of a processor, such as fetch and decode circuit 402 of FIG. 4. Detecting the pair of instructions may be performed by a pair detector circuit such as pair detector circuit 404 in some embodiments. In an embodiment, the first and second instructions are defined by an ISA used by the processor.

Method 1000 further includes obtaining a first portion of the constant value from the first instruction (at block 1020) and obtaining a second portion of the constant value from the second instruction (at block 1030). The method further includes, at block 1040, storing the first and second portions of the constant value in corresponding first and second portions of the destination register. The operations involved in obtaining the first and second portions of the constant value depend on the particular first and second instructions in the detected pair. For example, for an instruction pair including a move/zero instruction and a move/keep instruction, obtaining the first and second portions of the constant value may involve simply reading the immediate values from each of the first and second instructions. In the case of an instruction pair including an instruction for calculating a page address, obtaining the first portion of the constant value may include performing the page address calculation. Constant value 422 of FIG. 4 is an example of a constant value stored in a destination register as a result of the obtaining and storing of blocks 1020, 1030 and 1040. Obtaining the first and second portions of the constant value and storing the portions into first and second portions of the destination register can serve as a fused execution of the detected instruction pair. In an embodiment, the fused execution includes any of the operations involved in execution of the non-fused instructions that are needed to get the first and second portions of the constant value into their proper places in the destination register.

In an embodiment, fused execution including the obtaining and storing of blocks 1020, 1030 and 1040 is done by an MDR circuit of a processor, such as MDR circuit 406 of FIG. 4. The fused execution may be done by a constant generation circuit such as constant generation circuit 408 of FIG. 4 in some embodiments. In an embodiment, the fused execution is performed only if certain merge conditions are satisfied. Such merge conditions may include, in various embodiments, eligibility criteria described in connection with pair detector circuit 404 of FIG. 4. Method 1000 further includes, at block 1050, preventing instruction operations corresponding to the first instruction and second instruction from being dispatched to an execution pipeline of the processor. An execution pipeline as used herein includes execution circuitry of a processor external to an MDR circuit of the processor. The execution pipeline may further include other elements such as one or more reservation stations. In an embodiment, preventing instruction operations corresponding to the first and second instructions from being dispatched to an execution pipeline of the processor includes marking the instruction operations as complete at dispatch.

In some embodiments, method 1000 may further include decoding of the first and second instructions into corresponding first and second instruction operations such as first instruction operation 414 and second instruction operation 418 of FIG. 4. The method may further include associating one or more of the first and second instruction operations with an indicator of eligibility for fused execution, such as immediate execution identifier 416 or pair type identifier 420 of FIG. 4. Such an indicator of eligibility may in some embodiments signal to an MDR circuit such as MDR circuit 406 of FIG. 4 that the first and second instruction operations are eligible for fused execution by a constant generation circuit such as constant generation circuit 408. In an embodiment, the decoding and/or associating is performed by a fetch and decode circuit such as fetch and decode circuit 402. In various embodiments, checking for merge conditions such as those described above may be performed by either or both of a fetch and decode circuit determining whether the first and second instructions are eligible for fused execution or an MDR circuit determining whether to fuse execution of an eligible pair of instruction operations.

Figure 11:
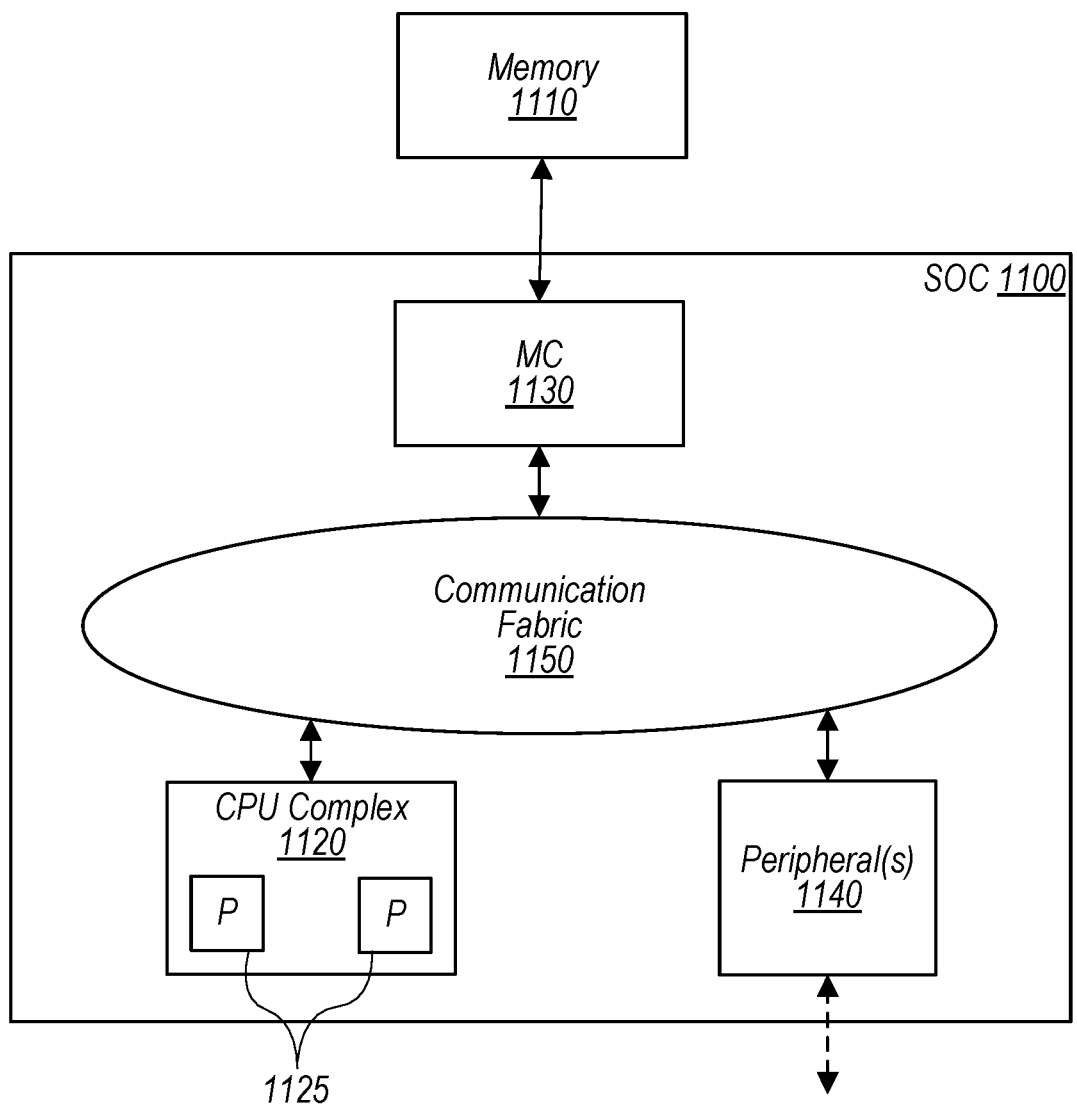
FIG. 11 is a block diagram illustrating example elements of a system on a chip (SOC) that is coupled to a memory, according to some embodiments.

Turning now to FIG. 11, a block diagram of an example system on a chip (SOC) 1100 that is coupled to a memory 1110 is depicted. As implied by the name, the components of SOC 1100 can be integrated onto a single semiconductor substrate as an integrated circuit "chip." In some cases, however, the components are implemented on two or more discrete chips in a computing system. In the illustrated embodiment, the components of SOC 1100 include a central processing unit (CPU) complex 1120, a memory controller (MC) 1130, one or more peripheral components 1140 (more briefly, "peripherals"), and a communication fabric 1150. Components 1120, 1130, and 1140 are all coupled to communication fabric 1150 as depicted, and memory controller 1130 may be coupled to memory 1110 during use. Also as shown, CPU complex 1120 includes at least two processors 1125 (P 1125 in FIG. 11). In some embodiments, SOC 1100 is implemented differently than shown. For example, SOC 1100 may include an always-on component, a display controller, a power management circuit, etc. It is noted that the number of components of SOC 1100 (and the number of subcomponents for those shown in FIG. 11, such as within the CPU complex 1120) may vary between embodiments. Accordingly, there may be more or fewer of each component or subcomponent than the number shown in FIG. 11.

Memory 1110, in various embodiments, is usable to store data and program instructions that are executable by CPU complex 1120 to cause a system having SOC 1100 and memory 1110 to implement operations described herein. Memory 1110 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), etc. Memory available to SOC 1100 is not limited to primary storage such as memory 1110. Rather, SOC 1100 may further include other forms of storage such as cache memory (e.g., L1 cache, L2 cache, etc.) in CPU complex 1120.

CPU complex 1120, in various embodiments, includes a set of processors 1125 that serve as a CPU of the SOC 1100. Processors 1125 may execute the main control software of the system, such as an operating system. Generally, software executed by the CPU during use control the other components of the system to realize the desired functionality of the system. Processors 1125 may further execute other software, such as application programs. An application program may provide user functionality and rely on the operating system for lower-level device control, scheduling, memory management, etc. Consequently, processors 1125 may also be referred to as application processors. CPU complex 1120 may include other hardware such as an L2 cache and/or an interface to the other components of the system (e.g., an interface to communication fabric 1150).

A processor 1125, in various embodiments, includes any circuitry and/or microcode that is configured to execute instructions defined in an instruction set architecture implemented by that processor 1125. Processors 1125 may fetch instructions and data from memory 1110 as a part of executing load instructions and store the fetched instructions and data within caches of CPU complex 1120. In various embodiments, processors 1125 share a common last level cache (e.g., an L2 cache) while including their own caches (e.g., an L0 cache, an L1 cache, etc.) for storing instructions and data. Processors 1125 may retrieve instructions and data (e.g., from the caches) and execute the instructions (e.g., conditional branch instructions, ALU instructions, etc.) to perform operations that involve the retrieved data. Processors 1125 may then write a result of those operations back to memory 1110. Processors 1125 may encompass discrete microprocessors, processors and/or microprocessors integrated into multichip module implementations, processors implemented as multiple integrated circuits, etc.

Memory controller 1130, in various embodiments, includes circuitry that is configured to receive, from the other components of SOC 1100, memory requests (e.g., load/store requests) to perform memory operations, such as accessing data from memory 1110. Memory controller 1130 may be configured to access any type of memory 1110, such as those discussed earlier. In various embodiments, memory controller 1130 includes queues for storing memory operations, for ordering and potentially reordering the operations and presenting the operations to memory 1110. Memory controller 1130 may further include data buffers to store write data awaiting write to memory 1110 and read data awaiting return to the source of a memory operation. In some embodiments, memory controller 1130 may include a memory cache to store recently accessed memory data. In SOC implementations, for example, the memory cache may reduce the power consumption in SOC 1100 by avoiding re-access of data from memory 1110 if it is expected to be accessed again soon. In some cases, the memory cache may also be referred to as a system cache, as opposed to private caches (e.g., L1 caches) in processors 1125 that serve only certain components. But, in some embodiments, a system cache need not be located within memory controller 1130.

Peripherals 1140, in various embodiments, are sets of additional hardware functionality included in SOC 1100. For example, peripherals 1140 may include video peripherals such as an image signal processor configured to process image capture data from a camera or other image sensor, GPUs, video encoder/decoders, scalers, rotators, blenders, display controllers, etc. As other examples, peripherals 1140 may include audio peripherals such as microphones, speakers, interfaces to microphones and speakers, audio processors, digital signal processors, mixers, etc. Peripherals 1140 may include interface controllers for various interfaces external to SOC 1100, such as Universal Serial Bus (USB), peripheral component interconnect (PCI) including PCI Express (PCIe), serial and parallel ports, etc. The interconnection to external devices is illustrated by the dashed arrow in FIG. 11 that extends external to SOC 1100. Peripherals 1140 may include networking peripherals such as media access controllers (MACs).

Communication fabric 1150 may be any communication interconnect and protocol for communicating among the components of SOC 1100. For example, communication fabric 1150 may enable processors 1125 to issue and receive requests from peripherals 1140 to access, store, and manipulate data. In some embodiments, communication fabric 1150 is bus-based, including shared bus configurations, cross bar configurations, and hierarchical buses with bridges. In some embodiments, communication fabric 1150 is packet-based, and may be hierarchical with bridges, cross bar, point-to-point, or other interconnects.

Figure 12:
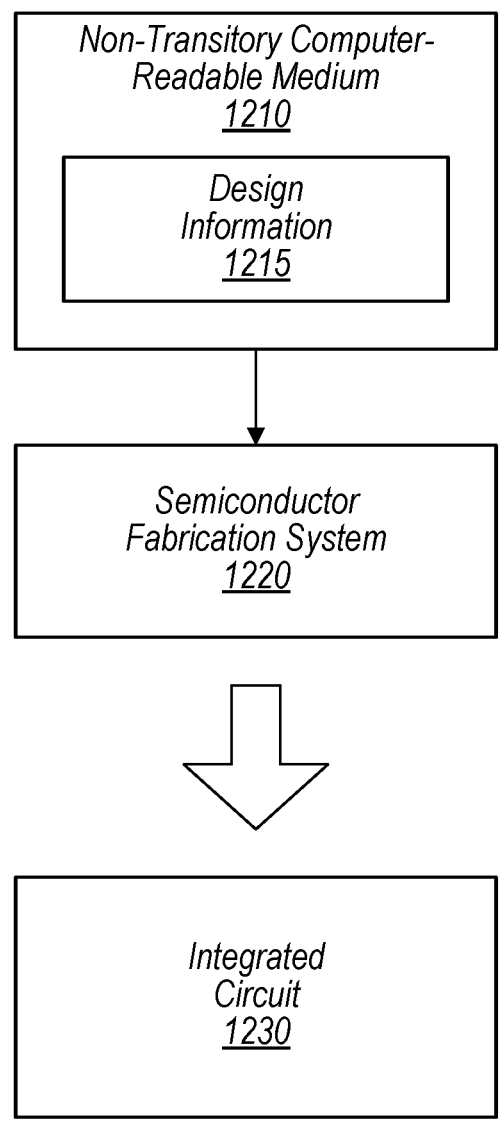
FIG. 12 is a block diagram illustrating an example process of fabricating at least a portion of an SOC, according to some embodiments.

Turning now to FIG. 12, a block diagram illustrating an example process of fabricating an integrated circuit 1230 that can include at least a portion of SOC 1100 is shown. The illustrated embodiment includes a non-transitory computer-readable medium 1210 (which includes design information 1215), a semiconductor fabrication system 1220, and a resulting fabricated integrated circuit 1230. In some embodiments, integrated circuit 1230 includes at least a CPU complex 1120, a memory controller 1130, and one or more peripherals 1140. Integrated circuit 1230 may further additionally or alternatively includes other circuits such as a wireless network circuit. In the illustrated embodiment, semiconductor fabrication system 1220 is configured to process design information 1215 to fabricate integrated circuit 1230.

Non-transitory computer-readable medium 1210 may include any of various appropriate types of memory devices or storage devices. For example, non-transitory computer-readable medium 1210 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 1210 may include two or more memory mediums, which may reside in different locations (e.g., in different computer systems that are connected over a network).

Design information 1215 may be specified using any of various appropriate computer languages, including hardware description languages such as, without limitation: VHDL, Verilog, SystemC, System Verilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system 1220. In some embodiments, design information 1215 may also include one or more cell libraries, which specify the synthesis and/or layout of integrated circuit 1230. In some embodiments, the design information is specified in whole or in part in the form of a netlist that specifies cell library elements and their connectivity. Design information 1215, taken alone, may or may not include sufficient information for fabrication of a corresponding integrated circuit (e.g., integrated circuit 1230). For example, design information 1215 may specify circuit elements to be fabricated but not their physical layout. In this case, design information 1215 may be combined with layout information to fabricate the specified integrated circuit.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements described with reference to FIGS. 1-10. Furthermore, integrated circuit 1230 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 1230 is performed. Design information 1215 may be generated using one or more computer systems and stored in non-transitory computer-readable medium 1210. The method may conclude when design information 1215 is sent to semiconductor fabrication system 1220 or prior to design information 1215 being sent to semiconductor fabrication system 1220. Accordingly, in some embodiments, the method may not include actions performed by semiconductor fabrication system 1220. Design information 1215 may be sent to semiconductor fabrication system 1220 in a variety of ways. For example, design information 1215 may be transmitted (e.g., via a transmission medium such as the Internet) from non-transitory computer-readable medium 1210 to semiconductor fabrication system 1220 (e.g., directly or indirectly). As another example, non-transitory computer-readable medium 1210 may be sent to semiconductor fabrication system 1220. In response to the method of initiating fabrication, semiconductor fabrication system 1220 may fabricate integrated circuit 1230 as discussed above.

Figure 13:
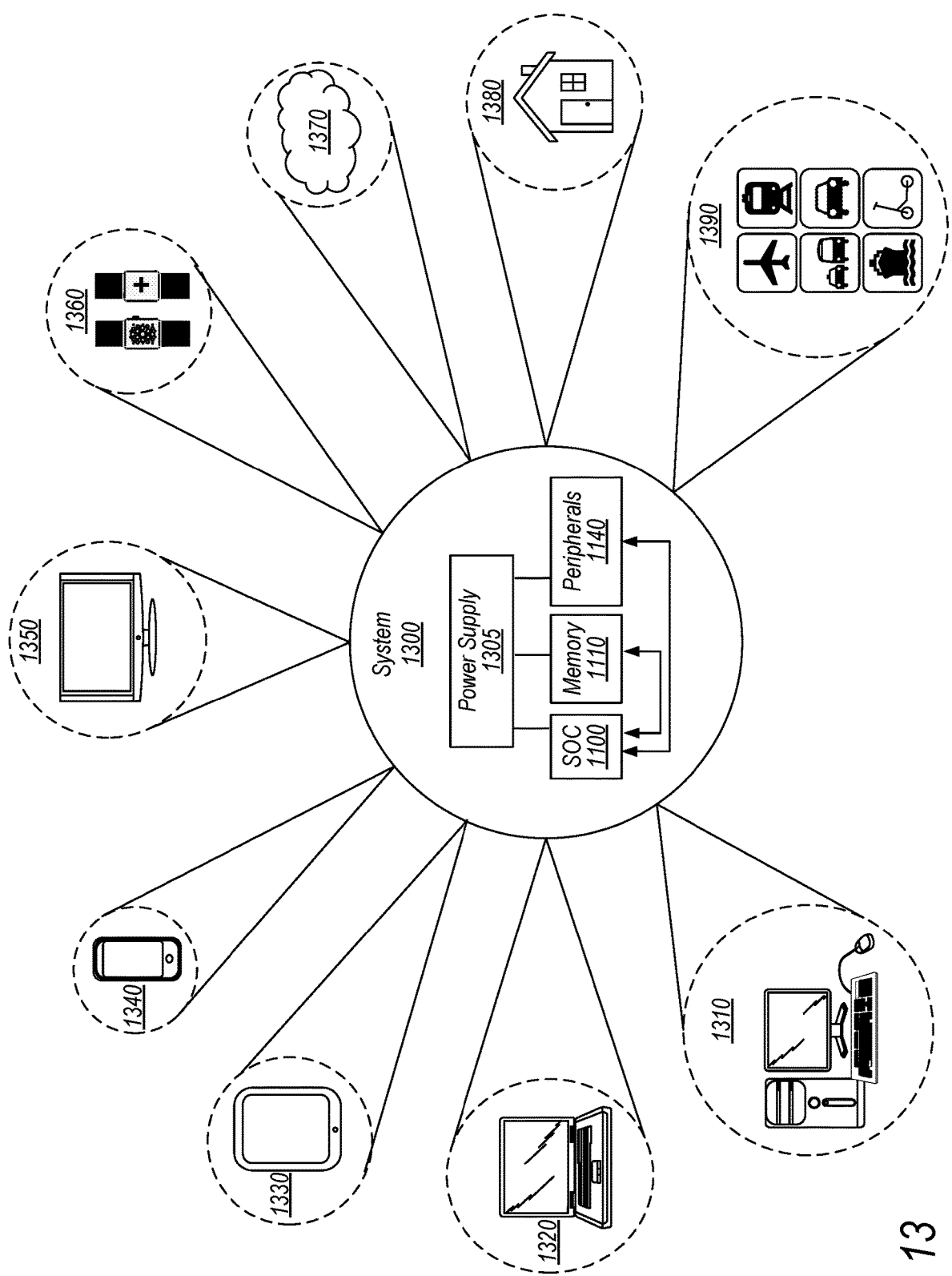
FIG. 13 is a block diagram illustrating an example SOC that is usable in various types of systems, according to some embodiments.

Turning next to FIG. 13, a block diagram of one embodiment of a system 1300 is shown that may incorporate and/or otherwise utilize the methods and mechanisms described herein. In the illustrated embodiment, the system 1300 includes at least one instance of a system on chip (SOC) 1100 that is coupled to external memory 1110, peripherals 1140, and a power supply 1305. Power supply 1305 is also provided which supplies the supply voltages to SOC 1100 as well as one or more supply voltages to the memory 1110 and/or the peripherals 1140. In various embodiments, power supply 1305 represents a battery (e.g., a rechargeable battery in a smart phone, laptop or tablet computer, or other device). In some embodiments, more than one instance of SOC 1100 is included (and more than one external memory 1110 is included as well).

As illustrated, system 1300 is shown to have application in a wide range of areas. For example, system 1300 may be utilized as part of the chips, circuitry, components, etc., of a desktop computer 1310, laptop computer 1320, tablet computer 1330, cellular or mobile phone 1340, or television 1350 (or set-top box coupled to a television). Also illustrated is a wearable device 1360, such as a smartwatch and/or health monitoring device. In some embodiments, a smartwatch may include a variety of general-purpose computing related functions. For example, a smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1300 may further be used as part of a cloud-based service(s) 1370. For example, the previously mentioned devices, and/or other devices, may access computing resources in the cloud (e.g., remotely located hardware and/or software resources). Still further, system 1300 may be utilized in one or more devices of a home 1380 other than those previously mentioned. For example, appliances within home 1380 may monitor and detect conditions that warrant attention. For example, various devices within home 1380 (e.g., a refrigerator, a cooling system, etc.) may monitor the status of the device and provide an alert to the homeowner (or, for example, a repair facility) should a particular event be detected. Alternatively, a thermostat may monitor the temperature in home 1380 and may automate adjustments to a heating/cooling system based on a history of responses to various conditions by the homeowner. Also illustrated in FIG. 13 is the application of system 1300 to various modes of transportation 1390. For example, system 1300 may be used in the control and/or entertainment systems of aircraft, trains, buses, cars for hire, private automobiles, waterborne vessels from private boats to cruise liners, scooters (for rent or owned), and so on. In various cases, system 1300 may be used to provide automated guidance (e.g., self-driving vehicles), general systems control, and otherwise. These any many other embodiments are possible and are contemplated. It is noted that the devices and applications illustrated in FIG. 13 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail.

Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A processor, comprising:
    fusion detector circuitry configured to:
        receive fetched instructions;
        detect a first pair of the fetched instructions, wherein the first pair includes:
            a first instruction that is executable to:
                perform a divide operation using a dividend from a first source register and a divisor from a second source register; and
                write a quotient of the divide operation to a first destination register; and
            a second instruction that is executable to:
                read the quotient, the dividend and the divisor from the first destination register, the first source register and the second source register;
                calculate a remainder of the divide operation; and
                write the remainder to the first destination register, overwriting the quotient; and
        fuse the first pair of the fetched instructions into a first fused instruction operation that is executable to use the dividend and the divisor to calculate the remainder and write the remainder instead of the quotient to the first destination register; and
    execution circuitry coupled to the fusion detector circuitry and configured to execute the first fused instruction operation.

2. The processor of claim 1, wherein the execution circuitry comprises:
    a divider circuit configured to generate a set of residual values related to the remainder; and
    a conversion circuit configured to convert the set of residual values into the remainder.

3. The processor of claim 1, wherein the execution circuitry is configured to execute the first fused instruction operation without performing a multiplication operation to calculate the remainder.

4. The processor of claim 1, wherein the second instruction is a multiply-subtract instruction that is executable to perform a multiplication of a pair of operands and to subtract a result of the multiplication from another operand, and wherein the first instruction is coded to supply the divisor and the quotient as the pair of operands to be multiplied and to supply the dividend as the other operand.

5. The processor of claim 1, wherein
    the fusion detector circuitry is further configured to:
        detect a second pair of the fetched instructions, wherein the second pair is executable to write, to a second destination register, a specified portion of an arithmetic/logic operation result, and wherein the second pair includes:
            a first instruction that is executable to perform an arithmetic/logic operation to produce the arithmetic/logic operation result and write the arithmetic/logic operation result to the second destination register; and
            a second instruction that is executable to perform a logical AND operation of the arithmetic/logic operation result with a specified mask bit sequence and write a result of the logical AND operation to the second destination register; and
        fuse the second pair of the fetched instructions into a second fused instruction operation that is executable to perform the arithmetic/logic operation and write to the second destination register the specified portion, corresponding to the specified mask bit sequence, of the arithmetic/logic operation result; and
    the execution circuitry is further configured to execute the second fused instruction operation.

6. The processor of claim 5, wherein the execution circuitry is further configured to generate the specified mask bit sequence.

7. The processor of claim 1, wherein
    the fusion detector circuitry is further configured to:
        detect a second pair of the fetched instructions, wherein the second pair includes:
            a first instruction that is executable to:
                perform a comparison of a first operand to a second operand; and
                write to one or more bits of a status register based on a result of the comparison; and
            a second instruction that is executable to write a value to a second destination register based on the first operand, the second operand, and bit values of the one or more bits of the status register; and
        fuse the second pair of the fetched instructions into a second fused instruction operation that is executable to perform the comparison of the first operand to the second operand and write to the second destination register based on the result of the comparison; and
    the execution circuitry is further configured to execute the second fused instruction operation.

8. The processor of claim 7, wherein the second instruction of the second pair is executable to store either the first operand or the second operand in the second destination register, based on the result of the comparison of the first operand and the second operand.

9. The processor of claim 7, wherein the second instruction of the second pair is executable to store either a value of "0" or a value of "1" in the second destination register, based on the result of the comparison of the first operand and the second operand.

10. The processor of claim 1, wherein the fusion detector circuitry is further configured to:
    detect a second pair of the fetched instructions, wherein the second pair is executable to store into a second destination register a constant value having a bit length larger than a width of an immediate value field of a first instruction or a second instruction of the second pair;
    perform a register storage operation executable to:
        obtain a first portion of the constant value from the first instruction of the second pair and a second portion of the constant value from the second instruction of the second pair; and
        store the first and second portions of the constant value in corresponding first and second portions of the second destination register; and
    prevent instruction operations corresponding to the first instruction of the second pair and the second instruction of the second pair from being dispatched to an execution pipeline of the processor.

11. The processor of claim 10, wherein:
    the first instruction of the second pair is one of:
        a move/zero instruction that is executable to write the first portion of the constant value to the first portion of the second destination register and write zeros to the second portion of the second destination register;
        a move/negate instruction that is executable to write the first portion of the constant value to the first portion of the second destination register and write ones to the second portion of the second destination register;
        a logical OR instruction that is executable to perform a bitwise OR operation of the first portion of the constant value with a source register filled with zeros and write a result of the bitwise OR operation to the first portion of the second destination register; or
        a logical XOR instruction that is executable to perform a bitwise exclusive OR operation of the first portion of the constant value with a source register filled with zeros and write a result of the bitwise exclusive OR operation to the first portion of the second destination register; and
    the second instruction of the second pair is a move/keep instruction that is executable to write the second portion of the constant value to the second portion of the second destination register without changing bit values in the first portion of the second destination register.

12. The processor of claim 10, wherein:
    the first instruction of the second pair is executable to calculate a first address of a target page in memory and write the first address to the second destination register; and
    the second instruction of the second pair is executable to add an offset value to the first address to form a second address and write the second address to the second destination register.

13. A method, comprising:
    detecting, by a processor, a first instruction of a first pair of instructions, wherein the first instruction of the first pair is executable by the processor to:
        perform a divide operation using a dividend from a first source register and a divisor from a second source register, and
        write a quotient of the divide operation to a first destination register;
    detecting, by the processor, a second instruction of the first pair of instructions, wherein the second instruction of the first pair is executable by the processor to:
        read the quotient, dividend and divisor from the first destination register, first source register and second source register, respectively;
        calculate a remainder of the divide operation; and
        write the remainder to the first destination register, overwriting the quotient;
    fusing, by the processor, the first pair of instructions into a first fused instruction operation that is executable by the processor to:
        use the dividend and the divisor to calculate the remainder; and
        write the remainder instead of the quotient to the first destination register; and
    executing, by the processor, the first fused instruction operation.

14. The method of claim 13, further comprising:
    detecting, by the processor, a first instruction of a second pair of instructions, wherein the first instruction of the second pair is executable by the processor to:
        perform an arithmetic/logic operation to produce an arithmetic/logic operation result; and
        write the arithmetic/logic operation result to a second destination register;
    detecting, by the processor, a second instruction of the second pair of instructions, wherein the second instruction of the second pair is executable by the processor to:
        perform a logical AND operation of the arithmetic/logic operation result with a specified mask bit sequence; and
        write a result of the logical AND operation to the second destination register;
    fusing, by the processor, the second pair of instructions into a second fused instruction operation that is executable to perform the arithmetic/logic operation and write to the second destination register a portion, corresponding to the specified mask bit sequence, of the arithmetic/logic operation result; and
    executing, by the processor, the second fused instruction operation.

15. The method of claim 13, further comprising:
    detecting, by the processor, a first instruction of a second pair of instructions, wherein the first instruction of the second pair is executable by the processor to perform a comparison of a first operand to a second operand and write to one or more bits of a status register based on a result of the comparison;
    detecting, by the processor, a second instruction of the second pair of instructions, wherein the second instruction of the second pair is executable by the processor to write a value to a second destination register based on the first operand, the second operand, and bit values of the one or more bits of the status register;
    fusing, by the processor, the second pair of instructions into a second fused instruction operation that is executable by the processor to perform the comparison of the first operand to the second operand and write to the second destination register based on the result of the comparison; and executing, by the processor, the second fused instruction operation.

16. The method of claim 13, further comprising:
detecting, by the processor, a second pair of instructions executable to store into a second destination register a constant value having a bit length larger than a width of an immediate value field of a first instruction or a second instruction of the second pair of instructions;
obtaining a first portion of the constant value from the first instruction of the second pair of instructions;
obtaining a second portion of the constant value from the second instruction of the second pair of instructions;
storing the first and second portions of the constant value in corresponding first and second portions of the second destination register; and
preventing instruction operations corresponding to the first instruction and second instruction of the second pair of instructions from being dispatched to an execution pipeline of the processor.

* * * * *